United States Patent
Giffin

(10) Patent No.: US 8,293,687 B2
(45) Date of Patent: Oct. 23, 2012

(54) COMPOSITIONS AND PROCESSES FOR FRACTURING SUBTERRANEAN FORMATIONS

(75) Inventor: Wade J. Giffin, Muscat (OM)

(73) Assignee: Titan Global Oil Services Inc., Bloomfield Hills, MI (US)

( * ) Notice: Subject to any disclaimer, the term of this patent is extended or adjusted under 35 U.S.C. 154(b) by 146 days.

(21) Appl. No.: 12/831,312

(22) Filed: Jul. 7, 2010

(65) Prior Publication Data
US 2011/0005969 A1    Jan. 13, 2011

Related U.S. Application Data

(60) Provisional application No. 61/224,305, filed on Jul. 9, 2009, provisional application No. 61/233,289, filed on Aug. 12, 2009, provisional application No. 61/321,660, filed on Apr. 7, 2010.

(51) Int. Cl.
 C09K 8/68    (2006.01)
 C09K 8/62    (2006.01)
 E21B 43/26   (2006.01)

(52) U.S. Cl. ........ 507/200; 507/217; 507/244; 507/256; 507/269; 507/921; 507/922; 507/923; 507/924; 166/308.1; 166/308.2; 166/308.3; 166/308.5

(58) Field of Classification Search ............... 507/921, 507/922, 923, 924, 200; 166/308.1, 308.2, 166/308.3, 308.5
See application file for complete search history.

(56) References Cited

U.S. PATENT DOCUMENTS

| | | | |
|---|---|---|---|
| 4,192,753 A | 3/1980 | Pye et al. |
| 4,552,591 A | 11/1985 | Millar |
| 4,650,000 A | 3/1987 | Andreasson et al. |
| 4,770,796 A | 9/1988 | Jacobs |
| 4,828,726 A | 5/1989 | Himes et al. |
| 4,843,118 A | 6/1989 | Lai et al. |
| 4,974,678 A | 12/1990 | Himes et al. |
| 4,977,962 A | 12/1990 | Himes et al. |
| 5,016,714 A | 5/1991 | McCabe et al. |
| 5,097,904 A | 3/1992 | Himes |
| 5,160,445 A | 11/1992 | Sharif |

(Continued)

FOREIGN PATENT DOCUMENTS
EP    0208373 A2    1/1987

(Continued)

OTHER PUBLICATIONS

International Search Report dated Oct. 15, 2010, application No. PCT/US2010/041148.

(Continued)

Primary Examiner — Ellen McAvoy
(74) Attorney, Agent, or Firm — Dobrusin & Thennisch PC

(57) ABSTRACT

The present invention is directed to novel additives packages, to fluid compositions including the additives, to methods of using the fluid compositions and the additives package, to methods of recovering hydrocarbons, and to petroleum products made from hydrocarbons derived from these methods. The novel additives packages may be used in a fluid composition for fracturing a subterranean. The additives package of the present invention include one or more gelling agents; one or more cross-linking agent; and one or more high temperature stabilizers; wherein the additives package further comprises one or more ingredients selected from the group consisting of a clay stabilizer, a metallic base, a cross-link retarder, and a gel breaker, and any combination thereof; and wherein the additives package optionally includes a diluent.

23 Claims, 10 Drawing Sheets

U.S. PATENT DOCUMENTS

| | | | |
|---|---|---|---|
| 5,197,544 A | 3/1993 | Himes | |
| 5,201,370 A | 4/1993 | Tjon-Joe-Pin | |
| 5,310,002 A | 5/1994 | Blauch et al. | |
| 5,420,174 A | 5/1995 | Dewprashad | |
| 5,478,860 A | 12/1995 | Wheeler et al. | |
| 5,497,830 A | 3/1996 | Boles et al. | |
| 5,566,760 A | 10/1996 | Harris | |
| 5,604,186 A | 2/1997 | Hunt et al. | |
| 6,001,158 A | 12/1999 | Elphingstone et al. | |
| 6,060,436 A | 5/2000 | Snyder et al. | |
| 6,133,204 A | 10/2000 | Newhouse et al. | |
| 6,177,385 B1 | 1/2001 | Nimerick | |
| 6,192,985 B1* | 2/2001 | Hinkel et al. | 166/280.1 |
| 6,265,355 B1 | 7/2001 | Lai et al. | |
| 6,599,863 B1 | 7/2003 | Palmer et al. | |
| 6,705,400 B1 | 3/2004 | Nguyen et al. | |
| 6,923,264 B2* | 8/2005 | Slabaugh et al. | 166/280.1 |
| 6,966,379 B2 | 11/2005 | Chatterji et al. | |
| 7,036,590 B2* | 5/2006 | Harris | 166/280.1 |
| 7,150,322 B2 | 12/2006 | Szymanski et al. | |
| 7,348,297 B2 | 3/2008 | Smith et al. | |
| 7,939,472 B2* | 5/2011 | Crews | 507/239 |
| 8,030,249 B2* | 10/2011 | Todd et al. | 507/211 |
| 8,084,401 B2* | 12/2011 | Lukocs et al. | 507/238 |
| 8,097,567 B2* | 1/2012 | Wilson, Jr. | 507/240 |
| 2003/0083403 A1 | 5/2003 | Dawson et al. | |
| 2004/0120853 A1 | 6/2004 | Carpenter et al. | |
| 2005/0164893 A1* | 7/2005 | Slabaugh et al. | 507/140 |
| 2005/0209107 A1 | 9/2005 | Pursley et al. | |
| 2006/0260815 A1 | 11/2006 | Dahanayake et al. | |
| 2007/0054968 A1 | 3/2007 | Scoggins | |
| 2007/0123431 A1 | 5/2007 | Jones et al. | |
| 2008/0004189 A1 | 1/2008 | Smith et al. | |
| 2008/0032903 A1 | 2/2008 | Starkey et al. | |
| 2008/0066918 A1 | 3/2008 | Smith | |
| 2008/0119375 A1 | 5/2008 | Barmatov et al. | |
| 2008/0269082 A1* | 10/2008 | Wilson et al. | 507/212 |
| 2009/0229827 A1 | 9/2009 | Bryant et al. | |

FOREIGN PATENT DOCUMENTS

| | | |
|---|---|---|
| WO | 0188334 A2 | 11/2001 |
| WO | 03001030 A1 | 1/2003 |
| WO | 2009097286 A1 | 8/2009 |

OTHER PUBLICATIONS

International Preliminary Report on Patentability dated Oct. 5, 2011, application No. PCT/US2010/041148.

Mason Publications, Hampshire, GB, Amines as thermal stabilizers polymeric oil well fracturing fluids, Research Disclosure, dated Jan. 1, 1985. vol. 249.

\* cited by examiner

COMPOSITIONS AND PROCESSES FOR FRACTURING SUBTERRANEAN FORMATIONS

CLAIM OF PRIORITY

The present application claims the benefit of U.S. Provisional Patent Application Nos. 61/224,305 (filed on Jul. 9, 2009), 61/233,289 (filed on Aug. 12, 2009), and 61/321,660 (filed on Apr. 7, 2010), which are hereby incorporated by reference in their entirety for all purpose.

FIELD OF THE INVENTION

The present invention relates generally to compositions and process for use in fracturing subterranean formations, and particularly to compositions and processes that enhance oil recovery.

BACKGROUND

Fracturing is a process of injecting large volumes of fluid having a suitable fluid composition into a well at high pressures to crack rock formations and create fissures for increased production of oil and gas.

Examples of processes and compositions that have been used for fracturing are described in U.S. Pat. No. 6,599,863, filed on Aug. 20, 1999 (issued on Jul. 29, 2003), U.S. Pat. No. 4,843,118, filed on Jun. 19, 1987 (issued on Jun. 27, 1989), and U.S. Pat. No. 6,705,400 filed on Aug. 28, 2002 (issued on Mar. 16, 2004), the entire contents of which are incorporated herein by reference.

Fluid compositions including a borate that are free of zirconium have been used at temperatures less than 107° C. At higher temperatures, the viscosity of the fluid drops quickly and the fluid is not effective in fracturing the subterranean formation, in stabilizing the fractured structure, or both. Zirconium based fluid compositions have been used for fracturing subterranean formations. Typically these fluids are shear unstable, i.e., the increase in viscosity upon reduction of the shear rate (e.g., as the fluid leaves the borehole and flows into the subterranean structure) is relatively small. Attempts to provide a fluid composition that can be used for fracturing subterranean formations, stabilizing the fractured structure, or both at temperatures greater than about 107° C. (e.g., greater than about 110°, or greater than about 115° C.) have required combinations of zirconium containing compounds and other compounds that result in expensive compositions, the need to combine multiple additives packages, or both. There is continued need for improved fluid compositions for fracturing subterranean formations that are less costly, can be used at higher temperatures, have good shear stability, or any combination thereof.

SUMMARY OF THE INVENTION

One or more of the above needs may be met with an additives package for use in a fracturing fluid composition (e.g., for fracturing subterranean structures to increase the yield of petroleum and/or hydrocarbon gases from the structures) comprising one or more gelling agents; one or more cross-linking agent; and one or more high temperature stabilizers; wherein the additives package further comprise an ingredient selected from the group consisting of a clay stabilizer, a metallic base, a cross-link retarder, a gel breaker, and any combination thereof; and wherein the additives package optionally includes a diluent; so that the additives package may be used in a fluid composition for fracturing a subterranean formation.

The additives package may be further characterized by one or any combination of the following features. The cross-linking agent may include a boron containing compound. The high temperature stabilizer may include a thiosulfate, an amine compound, or both. Any clay stabilizer may include a metal halide salt. Any cross-link retarder may include a gluconate salt. Any gel breaker may include a metal bromate. Any diluent may include an alcohol. The additives package may include a metal halide salt, a metallic base, a gluconate salt and a metal bromate. Any metal halide salt may include potassium chloride. The gelling agent may include a guar compound (e.g., hydroxypropyl guar). Any metallic base may include a metal hydroxide. Any metallic base may include an alkali metal hydroxide, an alkaline earth metal hydroxide, or any combination thereof. Any metallic base may include sodium hydroxide. Any gluconate salt may include sodium gluconate. Any thiosulfate compound may includes sodium thiosulfate. The boron containing compound may be a boron salt. The high temperature stabilizer (e.g., the amine compound) may include one or more alkanolamines. Any alkanolamine may be a monoalkanolamine, a dialkanolamine, a trialkanolamine, or any combination thereof. Any alkanolamine may include a trialkanolamine. Any alkanolamine may include an ethanolamine, a n-propanolamine, an isopropanolamine, or any combination thereof. Any alkanolamine may be a triethanolamine. The additives package may includes the alcohol. Any alcohol may include a diol selected from the group consisting of ethylene glycol, propylene glycol, a derivative thereof, and any combination thereof. Any alcohol may include an alcohol containing from about 1 to about 20 carbon atoms (e.g., 1-10 carbon atoms). Any alcohol may include methanol, ethanol, n-propanol, 2-propanol, n-butanol, 2-butanol, isopropanol, or any combination thereof. Any clay stabilizer (e.g., any metal halide salt) may be present at a concentration greater than about 5 wt. %, or even greater than about 30 wt. %, based on the total weight of the additives package. Any clay stabilizer (e.g., any metal halide salt) may be present at a concentration less than about 95 wt. %, or even less than about 70 wt. % (e.g., from about 40 wt. % to about 60 wt. %), based on the total weight of the additives package. The gelling agent may include one or more ingredients and may be present at a concentration greater than about 1 wt. %, or even greater than about 5 wt. %, based on the total weight of the additives package. The gelling agent may be present at a concentration of about 35 wt. % or less. The gelling agent may be present at a concentration of about 20 wt. % or less. The gelling agent may be present at a concentration from about 10 wt. % to about 15 wt. %, based on the total weight of the additives package. Any metallic base may be present at a concentration greater than about 0.1 wt. %. Any metallic base may be present at a concentration greater than about 1 wt. % based on the total weight of the additives package. Any metallic base may be present at a concentration less than about 12 wt. %, or even less than about 8 wt. % (e.g., from about 1.5 wt. % to about 3.5 wt. %), based on the total weight of the additives package. Any cross-link retarder (e.g., any gluconate salt) may be present at a concentration greater than about 1 wt. %, or even greater than about 4 wt. %, based on the total weight of the additives package. Any cross-link retarder (e.g., the gluconate salt) may be present at a concentration less than about 25 wt. %, or even less than about 15 wt. % based on the total weight of the additives package. Any cross-link retarder (e.g., the gluconate salt) may be present at from about 7 wt. % to about 11 wt. %, based on the total weight of the additives package. The high temperature stabilizer (e.g., the thiosulfate compound) may be present at a concentration greater than about 2 wt. %, or even greater than about 5 wt. %, based on the total weight of the additives package. The high temperature stabilizer (e.g., the thiosulfate compound) may be present at a concentration less than about 35 wt. %, or even less than about 20 wt. % (e.g., from about 10 wt. % to about 15 wt. %), based on the total weight of the additives package. The cross-linking agent (e.g., the boron containing compound) may be present at a concentration greater than about 2 wt. %, or even greater than about 5 wt. % based on the total weight of the additives package. The cross-linking agent (e.g., the boron containing compound) may be present at a concentration less than about 35 wt. %, or even less than about 20 wt. % (e.g., from about 10 wt. % to about 15 wt. %), based on the total weight of the additives package. The high temperature stabilizer (e.g., the amine compound) may be present at a concentration greater than about 0.5 wt. %, or even greater than about 2 wt. %) based on the total weight of the additives package. The high temperature stabilizer (e.g., the amine compound) may be present at a concentration less than about 35 wt. %, or even less than about 20 wt. % (e.g., from about 5 wt. % to about 15 wt. %), based on the total weight of the additives package. Any diluent (e.g., any alcohol) may be present at a concentration greater than about 0.5 wt. % based on the total weight of the additives package. The alcohol may be present at a concentration less than about 50 wt. % based on the total weight of the additives package. The additives package may be free of zirconium. The additives package may be free of titanium.

Another aspect of the invention is directed at a fluid composition for fracturing a subterranean formation including an additives package, such as one described herein. This aspect of the invention may be further characterized by one or any combination of the following. The fluid composition may further comprise about 50 wt. % or more of a carrier liquid based on the total weight of the fluid. The carrier liquid may include water; The fluid composition may be essentially free of zirconium (e.g., there is less than about 5 wt. %, less than about 3 wt. %, less than 1 wt. % or even less than 0.5 wt. % (e.g., any amounts present are in trace amounts, for example, less than about 1000 ppm, less than about 100 ppm zirconium)). The fluid composition may be essentially free of titanium (e.g., there is less than about 5 wt. %, less than about 3 wt. %, less than 1 wt. % or even less than 0.5 wt. % (e.g., any amounts present are in trace amounts, for example, less than about 1000 ppm, less than about 100 ppm titanium)). The fluid composition may include the clay stabilizer (e.g., the metal halide salt) at a concentration from about 30 to about 500 ppt (i.e., pounds per thousand gallons of fluid) (preferably from about 80 to about 350 ppt, more preferably from abut 120 to about 250 ppt). The fluid composition may include the gelling agent at a concentration from about 5 to about 150 ppt (preferably from about 15 to about 100 ppt, more preferably from abut 30 to about 50 ppt). The fluid composition may include the metallic base at a concentration from about 0.5 to about 50 ppt (preferably from about 4 to about 20 ppt, more preferably from abut 6 to about 12 ppt, and most preferably from about 8 to about 10 ppt). The fluid composition may include the cross-link retarder (e.g., the gluconate salt) at a concentration from about 1 to about 150 ppt (preferably from about 5 to about 80 ppt, more preferably from abut 15 to about 50 ppt, and most preferably from about 20 to about 35 ppt). The fluid composition may include the high temperature stabilizer (e.g., the thiosulfate compound) at a concentration from about 2 to about 160 ppt (preferably from about 10 to about 90 ppt, more preferably from abut 20 to about 60 ppt, and most preferably from about 30 to about 45 ppt). The fluid composition may include the cross-linking agent (e.g., the boron containing compound) at a concentration from about 0.5 to about 50 gpt (i.e., gallons per thousand gallons of fluid) (preferably from about 1 to about 30 gpt, more preferably from abut 2 to about 15 gpt, and most preferably from about 3 to about 7 gpt). The fluid composition may include the cross-linking agent (e.g., the borate) at a concentration from about 0.02 to about 20 ppt (preferably from about 0.1 to about 10 ppt, more preferably from about 0.2 to about 5 ppt, and most preferably from about 0.5 to about 4 ppt). The fluid composition may include the high temperature stabilizer (e.g., the amine compound) at a concentration from about 0.5 to about 100 gpt (preferably from about 1 to about 40 gpt, more preferably from abut 2 to about 20 gpt, and most preferably from about 3 to about 15 gpt). The fluid composition may include the diluent (e.g., the alcohol) at a concentration from about 0.5 to about 200 gpt (preferably from about 1 to about 40 gpt, more preferably from abut 2 to about 20 gpt, and most preferably from about 3 to about 15 gpt). The fluid composition may have a pH from about 10 to about 13.5 at a temperature of about 25° C. The fluid composition may have a pH from about 10.5 to about 13 at a temperature of about 25° C. The fluid composition may have a pH from about 11 to about 12.7 at a temperature of about 25° C. The fluid composition may have a pH from about 11.4 to about 12.4 at a temperature of about 25° C.

A process related aspect of the invention is directed at a process for fracturing a subterranean formation comprising a step of injecting a fluid composition (e.g., one or more of the compositions in the above aspects described in this summary of the invention), such as a fluid composition described herein, into a subterranean formation, and may further include recovering a petroleum containing material and/or a hydrocarbon gas containing material from the formation. The processes herein may include one or more additional steps of: fractionating a petroleum containing material and/or a hydrocarbon gas containing material into a plurality of fractions (such as a liquefied petroleum gas fraction, a naphtha fraction, a gasoline fraction, a kerosene fraction, a diesel oil fraction, a lubricating oil fraction, a fuel oil fraction, a residue fraction, or any combination thereof), optionally refining one or more of such fractions, optionally reacting one or more of such fractions (e.g., to form a polymeric material or a precursor thereof), optionally cracking (e.g., hydrocracking and/or fluid catalytic cracking) one or more of such fractions, optionally hydrotreating of one or more of such fractions, optionally platforming one or more of such fractions (over a platinum-containing catalyst to produce reformate and hydrogen), optionally isomerizing one or more of such fractions, optionally alkylating one or more of such fractions, or any combination thereof.

The process may be further characterized by one or any combination of the following The fluid composition, the subterranean formation, or both may have a temperature greater than about 105° C. The fluid composition, the subterranean formation, or both may have a temperature greater than about 121° C. The fluid composition, the subterranean formation, or both may have a temperature greater than about 135° C. The fluid composition, the subterranean formation, or both may have a temperature greater than about 145° C. The fluid composition, the subterranean formation, or both may have a temperature less than about 300° C. The fluid composition, the subterranean formation, or both may have a temperature less than about 230° C. The fluid composition, the subterranean formation, or both may have a temperature less than about 210° C. The fluid composition, the subterranean formation, or both may have a temperature less than about 200° C. The fluid composition, the subterranean formation, or both may have a temperature less than about 180° C.

Another aspect of the invention is directed at a petroleum based product made using a hydrocarbon obtained from a subterranean formation that is fractured using a fluid composition (e.g., one or more of the compositions in the above aspects described in this summary of the invention). By way of example, such products may be a polymeric article (e.g., a shaped article made by processing a polymeric article derived from a fracturing process herein). Such products may be a fuel (e.g., a gasoline, a kerosene, a heating oil, a diesel fuel, or any combination thereof), a lubricant, a functional fluid, a cleaner, a solvent, a coating, a construction material, an asphalt, a monomer, or a prepolymer.

BRIEF DESCRIPTION OF THE DRAWINGS

FIG. 8 illustrates some of the benefits of including an amine.

DETAILED DESCRIPTION

Figure 1:
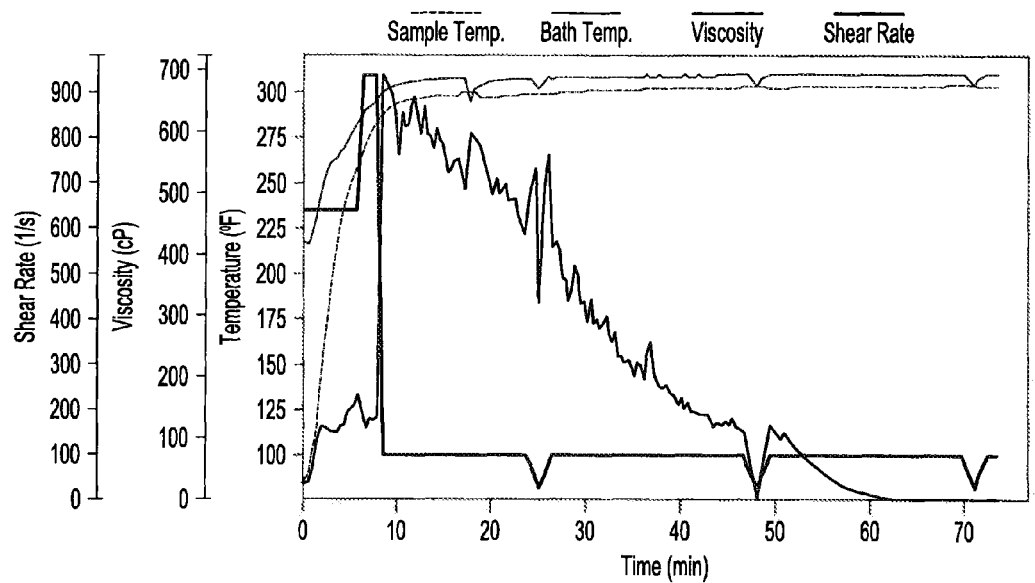
FIG. 1 is an illustrative rheometer curve expected for a fluid composition tested at about 149° C. (about 300° F.).

The present invention, in its various aspects, makes use of a unique combination of materials to derive an attractive additives package for use in a fluid composition for fracturing (e.g., hydraulic fracturing) subterranean structures.

The additives package and fluid compositions of the present invention are surprisingly robust and can be used for fracturing subterranean structures having high temperatures. High temperature subterranean structures have generally been difficult to fracture due to the changes in the viscoelastic properties of the fluid compositions when exposed to the high temperatures. Additionally, the same additives package and/or fluid compositions containing the same additives may also be used (e.g., at similar or different concentrations of additives) for fracturing subterranean structures having lower temperatures. As such, the additives package and fluid compositions in the present invention are capable of fracturing subterranean structures having a surprisingly broad range of temperatures.

The additives package and fluid compositions of the present invention are particularly useful in fracturing processes in which the subterranean structure being fractured has a maximum temperature greater than about 107° C., preferably greater than about 110° C., more preferably greater than about 115° C., and most preferably greater than about 121° C. (e.g., greater than about 135° C., or even greater than about 149° C.). The additives package and fluid compositions may be used in processes in which the subterranean structure being fractured has a maximum temperature less than about 300° C., preferably less than about 230° C., more preferably less than about 220° C., and even more preferably less than about 200° C. Although capable of being used at relatively high temperatures, the additives package and fluid compositions may also find utility at relatively low temperatures (e.g., at temperatures less than about 180° C., less than about 150° C., less than about 115° C.; less than about 100° C., or even less than about 70° C.

The additives package, the fluid composition, or both includes a gelling agent, a cross-linking agent such as a boron containing compound, a thiosulfate compound, an amine compound, and further includes one, two, three, or even all of the following ingredients: a metal halide salt, a metallic base, a gluconate salt, and a metallic bromate. Preferably, the additives package, the fluid composition, or both, includes at least one of a gelling agent; a boron containing compound; a thiosulfate compound; a metal halide salt; a metallic base; a gluconate salt; or a metallic bromate. The additives package, the fluid composition, or both, may optionally include an alcohol.

Gelling Agent

The gelling agent may be one or more material that can be gelled, cross-linked or both. It may be one or more organic material. The gelling agent may be or include one or more oligomers, one or more polymer, or both. It may be synthetic, naturally occurring, or both. Without being bound by theory, the gelling agent may function to keep a fracture in the subterranean formation open so that a proppant can penetrate into the fracture and/or further propagate the fracture. For example, the gelling agent may include, or consist essentially of (e.g., greater than about 50 wt. %, preferably greater than 90 wt. % of the gelling agent), or consist entirely of one or more guar gums. Without limitation, the guar gum may include a substituted guar gum, such as a guar gum that is substituted with one or more hydrocarbons containing one or more hydroxyl groups (e.g., a hydroxylalkyl substituted guar gum). An exemplary gelling agent that may be used is a gelling agent that includes, consists essentially of (e.g., greater than about 50 wt. %, preferably greater than 90 wt. % of the gelling agent), or consist entirely of hydroxypropyl guar. Hydroxypropyl guar may be prepared by the hydroxypropylation of guar gum. An exemplary hydroxypropyl guar that may be used is commercially available from Acromont Corporation under the grade name ACRODRILL-HPG. The guar gum may be a carbomethylhydroxypropylguar. Refined or purified guar gums are generally preferred over unrefined guar gums, particularly for applications requiring a relatively good shear stability of the fluid composition. Preferred guar gums have a density from about 0.5 to about 0.85 g/cm³, more preferably from about 0.65 to about 0.70 g/cm³.

The gelling agent may be present at a concentration sufficient to support the fractured subterranean structure. If the concentration of the gelling agent is too low, the fluid composition may leak-off in an undesirable manner to the surrounding rock, the fracture length may be insufficient, the fracture height may be insufficient, or any combination thereof. If the concentration of the gelling agent is too high, there may be unsuitably high build up of filter cake, reducing the inflow ability of the well around the propagated fracture. Though some of these are potentially undesirable consequences, they may be tolerated in relatively small quantities or occurrences, or if other performance attributes are otherwise met. The gelling agent preferably is present in an additives package at a concentration greater than about 1 weight percent, more preferably greater than about 2 weight percent, even more preferably greater than about 5 weight percent, and most preferably greater than about 10 weight percent based on the total weight of the additives package, based on the total weight of the active ingredients in the additives package (i.e., the weight of the additives package less the weight of any water in the additives package), or both. The gelling agent preferably is present in an additives package at a concentration less than about 65 weight percent, more preferably less than about 50 weight percent, even more preferably less than about 35 weight percent, even more preferably less than about 25 weight percent, and most preferably less than about 20 weight percent based on the total weight of the active ingredients in the additives package (i.e., the weight of the additives package less the weight of any water in the additives package), or both. The gelling agent is preferably present in the fluid composition at a concentration of about 1 ppt (i.e., pounds per thousand gallons) or more, more preferably about 5 ppt or more, even more preferably about 15 ppt or more, and most preferably about 30 ppt or more. The gelling agent is preferably present in the fluid composition at a concentration of about 350 ppt (i.e., pounds per thousand gallons) or less, more preferably about 150 ppt or less, even more preferably about 100 ppt or less, and most preferably about 50 ppt or less.

The weight ratio of the gelling agent to the cross-linking agent may be about 1:30 or more, preferably about 1:10 or more, more preferably about 1:5 or more, and most preferably about 1:3 or more. The weight ratio of the gelling agent to the cross-linking agent may be about 30:1 or less, preferably about 10:1 or less, more preferably about 5:1 or less, even more preferably about 3:1 or less, and most preferably about 1:1 or less. The weight ratio of the gelling agent (e.g., the hydroxypropyl guar) to the metal halide salt (e.g., the potassium chloride) may be greater than about 1:20, more preferably greater than about 1:10, and most preferably greater than about 1:6. If employed, the weight ratio of the gelling agent (e.g., the hydroxypropyl guar) to the metal halide salt (e.g., the potassium chloride) preferably is less than about 2:1, more preferably less than about 1:1, and most preferably less than about 1:2. For example the weight ratio of the gelling agent to the metal halide salt may be about 1:4.

Cross-Linking Agent/Boron Containing Compound

The additives package preferably contains one or more cross-linking agents capable of cross-linking the gelling agent. The cross-linking agent may be inorganic, organic, an organometallic, or any combination thereof. Any cross-linking agent known to those skilled in the art of cross-linking a guar gelling agent may be employed. For example, the cross-linking agent may include one or more boron containing compound. The boron containing compound may be a boron salt. Without limitation, the boron containing compound may be a borate. Exemplary borates include metal borates, such as a metal borate including an alkali metal, an alkaline earth metal, a transition metal or any combination thereof. For example, the boron containing compound may include one, two, or more metals selected from the group consisting of sodium, calcium, potassium, barium, and magnesium. The boron containing compound may include, consist essentially of (e.g., at least 70 wt. %, preferably at least 90 wt. % based on the total weight of the boron containing compound), or consist entirely of sodium borate. Without being bound by theory, the boron containing compound may function by forming cross-links to stabilize fissures formed in a subterranean formation.

Examples of boron containing compounds which may be used in the additives package, the fluid composition or both include borates described in U.S. Pat. No. 5,160,445 (Filed on May 24, 1991 by Sharif, Sharif, application Ser. No. 07/705, 605), and U.S. Pat. No. 6,177,385 (Nimerick, issued on Jan. 23, 2001), the contents of which are both incorporated herein by reference.

Preferably the cross-linking agent, the additives package, the fluid composition, or any combination thereof is substantially entirely free of titanium and/or zirconium cross-linking agents. For example, the additives package, the fluid composition, or both are substantially entirely free of one or more (or even all) of the titanium and/or zirconium cross-linking agents disclosed in U.S. Pat. No. 4,770,796, issued Sep. 13, 1988, column 4, lines 3-31, incorporated herein by reference. If employed, the total concentration of titanium and zirconium cross-linking agents is preferably less than about 50 weight percent more preferably less than about 20 weight percent based on the total concentration of the one or more cross-linking agents.

The cross-linking agent may be included in an additives package, in a fluid composition, or both, at a concentration sufficient to cross-link at least a portion of the gelling agent, or to otherwise cause the viscosity of the gelling agent to increase. for instance, the concentration of the cross-linking agent may be sufficient to increase the viscosity of the gelling agent by at 100% or more, more preferably about 200% or more, even more preferably about 400% or more, even more preferably about 800% or more, and most preferably about 1500% or more. For example, the initial viscosity of the gelling agent, before reacting the gelling agent with the cross-linking agent, may be about 100 cp or less, about 50 cp or less, or even about 30 cp or less, measured at a shear rate of about 100 1/s and a temperature of about 100° C. After reacting with the cross-linking agent, the gelling agent may have a viscosity of about 300 cp or more, about 600 cp or more, about 1000 cp or more, or even about 1500 cp or more, measured at a shear rate of about 100 1/s and a temperature of about 100° C.

Preferably the concentration of the cross-linking agent (e.g., the concentration of the one or more boron containing compounds) in the additives package is about 1 weight percent or more, more preferably about 2 weight percent or more, even more preferably about 5 weight percent or more, and most preferably about 10 weight percent or more, based on the total weight of the additives package, based on the total weight of the active ingredients in the additives package (i.e., the weight of the additives package less the weight of any water in the additives package), or both. Preferably the concentration of the cross-linking agent (e.g., the concentration of the one or more boron containing compounds) in the additives package is about 50 weight percent or less, more preferably about 35 weight percent or less, even more preferably about 20 weight percent or less, and most preferably about 15 weight percent or less, based on the total weight of the additives package, based on the total weight of the active ingredients in the additives package (i.e., the weight of the additives package less the weight of any water in the additives package), or both. The concentration of the cross-linking agent (e.g., the total concentration of the one or more boron containing compounds) in the fluid composition preferably is about 0.2 gpt (gallons per thousand gallons of fluid) or more, more preferably about 0.5 gpt or more, even more preferably about 1 gpt or more, even more preferably about 2 gpt or more, and most preferably about 3 gpt or more. The concentration of the cross-linking agent (e.g., the total concentration of the one or more boron containing compounds) in the fluid composition preferably is about 50 gpt (gallons per thousand gallons of fluid) or less, more preferably about 300 gpt or less, even more preferably about 15 gpt or less, even more preferably about 10 gpt or less, and most preferably about 7 gpt or less.

High Temperature Stabilizer/Amine Compound/Thiosulfate Compound

The additives package (e.g., for use in a fluid compound) preferably contains one or more high temperature stabilizer compounds. The high temperature stabilizer may be any compound that makes the viscosity of the cross-linked fluid composition more stable at high temperatures (e.g., at temperatures greater than about 115° C.) as compared with compositions that omitted such compound. For example, a preferred approach is to employ at least one amine compound. Without being bound by theory, it is believed that the amine compound may react to form stable compounds or otherwise stabilize the fluid compositions, such that it may be used in high temperature applications (e.g., temperatures greater than about 150° C., greater than about 175° C., or even greater than about 190° C.). The high temperature stabilizer may function as an oxygen scavenger. The amine compound preferably includes amine compounds containing from about 2 to about 50 carbon atoms. Preferred amine compounds include one or more alcohol (i.e., —OH) groups. For example, the amine compound may include, consists essentially of, or consist entirely of one, two, or more alkanolamines. Exemplary alkonaolamines that may be used include monoalkanolamines, dialkanolamines, trialkanolamines, or any combination thereof. Without limitation, the alkanolamine may include an ethanolamine, a n-propanolamine, an isopropanolamine, or any combination thereof. A particularly preferred alkanolamine that may be used includes triethanolamine (e.g., it consists essentially of 2-(bis(2-hydroxyethyl)amino)ethanol).

Another high temperature stabilizer that may be used alone or in addition to one or more other high temperature stabilizers (such as one or more amine compounds) is a thiosulfate compound. Without limitation, thiosulfate compounds that may be used include metal thiosulfates, such as an alkali metal thiosulfate, an alkaline earth metal thiosulfate, a transition metal thiosulfate, and any combination thereof. Preferred thiosulfate compounds include sodium thiosulfate, potassium thiosulfate, calcium thiosulfate, magnesium thiosulfate, barium thiosulfate, or any combination thereof. More preferably the thiosulfate compound includes, consists essentially of, or consists entirely of sodium thiosulfate. Without being bound by theory, the thiosulfate compound is believed to improve the temperature stability of the fluid composition, e.g., in a process having a temperature greater than about 90° C., greater than about 107° C., greater than about greater than about 121° C., greater than about 135° C., or even greater than about 149° C.

The additives packages, the fluid compositions, or both, preferably include one or more amine compounds, one or more thiosulfate compounds, or more preferably both one or more amine compounds and one or more thiosulfate compounds.

The high temperature stabilizer may be present in the additives package, the fluid composition or both at a concentration sufficient to allow for a high ratio of the viscosity after being exposed to high temperature to the initial viscosity, a high viscosity retention time, or both (as described hereinafter). The high temperature stabilizer (e.g., the amine compound the thiosulfate compound, or both) preferably is included in the additives package at a concentration greater than about 0.1 wt. %, more preferably greater than about 0.5 wt. %, even more preferably greater than about 2 wt. %, even more preferably greater than about 4 wt. % and most preferably greater than about 5 wt. % based on the total weight of the additives package, based on the total weight of the active ingredients in the additives package (i.e., the weight of the additives package less the weight of any water in the additives package), or both. The high temperature stabilizer (e.g., the amine compound the thiosulfate compound, or both) preferably is included in the additives package at a concentration less than about 35 wt. %, more preferably less than about 25 wt. %, even more preferably less than about 20 wt. %, even more preferably less than about 15 wt. % and most preferably less than about 10 wt. % based on the total weight of the additives package, based on the total weight of the active ingredients in the additives package (i.e., the weight of the additives package less the weight of any water in the additives package), or both.

The high temperature stabilizer (e.g., the amine compound, the thiosulfate compound, or both) preferably is included in the fluid composition at a concentration greater than about 0.05 gpt (gallons per thousand gallons of fluid), more preferably greater than about 0.1 gpt, even more preferably greater than about 0.5 gpt, even more preferably greater than about 1 gpt, even more preferably greater than about 2 gpt and most preferably greater than about 3 gpt based on the total volume of the fluid composition. The high temperature stabilizer (e.g., the amine compound, the thiosulfate compound, or both) preferably is included in the fluid composition at a concentration less than about 100 gpt, more preferably less than about 40 gpt, even more preferably less than about 20 gpt, even more preferably less than about 15 gpt and most preferably less than about 10 gpt based on the total volume of the fluid composition. The high temperature stabilizer (e.g., the amine compound, the thiosulfate compound, or both) preferably is included in the fluid composition at a concentration of about 2 ppt (pounds per thousand gallons of fluid) or more, more preferably about 5 ppt or more, even more preferably about 10 ppt or more, even more preferably about 20 ppt or more, and most preferably about 30 ppt or more based on the total volume of the fluid composition. The high temperature stabilizer (e.g., the amine compound, the thiosulfate compound, or both) preferably is included in the fluid composition at a concentration of about 160 ppt (pounds per thousand gallons of fluid) or less, more preferably about 90 ppt or less, even more preferably about 60 ppt or less, and most preferably about 45 ppt or less, based on the total volume of the fluid composition.

Clay Stabilizer/Metal Halide Salt

The additives package, the fluid composition, or both, may optionally include one or more clay stabilizer. Any clay stabilizer known to one skilled in the art of formulating fluid compositions for fracturing subterranean formations may be used. The clay stabilizer may function by reducing the swelling of clay particles in the formation. Without the clay stabilizer, the clay may swell, reduce the permeability of the formulation, or both. Examples of clay stabilizers which may be used include, but are not limited to, potassium chloride, sodium chloride, ammonium chloride and tetramethyl ammonium chloride and the like. Additional examples of clay stabilizers that may be used in the present invention are disclosed for example U.S. Pat. No. 5,197,544 (issued on Dec. 18, 1991); U.S. Pat. No. 5,097,904 (issued on Feb. 28, 1991); U.S. Pat. No. 4,977,962 (issued on Mar. 28, 1989); U.S. Pat. No. 4,974,678 (issued on May 15, 1990); and U.S. Pat. No. 4,828,726 (issued on Sep. 11, 1987), the entire disclosures of which are incorporated herein by reference. By way of example, the clay stabilizer may include or consist essentially of one or more metal halide salts. Preferred metal halide salts includes a halogen (i.e., IUPAC Group 17) selected from chlorine, fluorine, bromine, iodine, and any combination thereof. The metal halide salt preferably includes a metal selected from an alkali metal, an alkaline earth metal, an a transition metal, or any combination thereof. More preferably the metal halide salt includes or consists essentially of an alkali metal (i.e., IUPAC Group 1) or an alkaline earth metal (i.e., IUPAC Group 2). Without limitation, exemplary metal halide salts which may be used include sodium chloride, calcium chloride, potassium chloride, magnesium chloride, sodium bromide, potassium bromide, calcium bromide, magnesium bromide, sodium fluoride, calcium fluoride, potassium fluoride, magnesium fluoride, sodium iodide, calcium iodide, potassium iodide, magnesium iodide, or any combination thereof. The salt may be an iodide, a bromide, a fluoride, a chloride, or any combination thereof. A particularly preferred metal halide salt is a metal halide salt that includes, consists essentially of (e.g., at least about 70 wt. %, preferably at least about 90 wt. % based on the total weight of the metal halide salt), or consists entirely of potassium, a chloride, or a combination of both (e.g., potassium chloride).

If employed, the concentration of the clay stabilizer in the additives package, the fluid composition, or both, should be sufficient to reduce or eliminate that swelling of the clay particles in the formation. Preferably the concentration of the clay stabilizer in the additives package is about 5 weight percent or more, more preferably about 15 weight percent or more, even more preferably about 35 weight percent or more, and most preferably about 40 weight percent or more, based on the total weight of the active ingredients in the additives package (i.e., the weight of the additives package less the weight of any water in the additives package), or both. Preferably, the concentration of the clay stabilizer in the additives package is about 95 weight percent or less, more preferably about 80 weight percent or less, even more preferably about 70 weight percent or less, and most preferably about 60 weight percent or less, based on the total weight of the active ingredients in the additives package (i.e., the weight of the additives package less the weight of any water in the additives package), or both. The concentration of the clay stabilizer in the fluid composition preferably is about 30 ppt (pounds per thousand gallons of fluid) or more, more preferably about 80 ppt or more, and most preferably about 120 ppt or more. The concentration of the clay stabilizer in the fluid composition preferably is about 500 ppt (pounds per thousand gallons of fluid) or less, more preferably about 350 ppt or less, and most preferably about 250 ppt or less.

If employed, the weight ratio of the thiosulfate compound (e.g., the sodium thiosulfate) to the metal halide salt (e.g., the potassium chloride) preferably is greater than about 1:20, more preferably greater than about 1:10, and most preferably greater than about 1:6. If employed, the weight ratio of the thiosulfate compound (e.g., the sodium thiosulfate) to the metal halide salt (e.g., the potassium chloride) preferably is less than about 2:1, more preferably less than about 1:1, and most preferably less than about 1:2. For example the weight ratio of the thiosulfate compound to the metal halide salt may be about 1:4.

Metallic Base

The additives package, the fluid composition, or both may include one or more base, and more specifically a metallic base, such as an alkali earth metal hydroxide or an alkaline earth metal hydroxide. Any base capable of controlling the pH of the fluid composition so that the fluid composition is generally alkaline may be employed. Without limitation, metallic bases which may be used include lithium hydroxide, sodium hydroxide, potassium hydroxide, barium hydroxide, calcium hydroxide, magnesium hydroxide, rubidium hydroxide, beryllium hydroxide, or any combination thereof. A particularly preferred metallic base is a metallic base that includes, consists essentially of (e.g., at least 70 wt. %, preferably at least 90 wt. % based on the total weight of the metallic base), or consists entirely of sodium hydroxide (i.e., caustic soda).

The additives package, the fluid composition, or both, may contain a sufficient amount of the metallic base, so that a fluid composition having a desired pH (such as a pH described hereinafter) may be provided to a subterranean structure to be fractured. The base (e.g., the metallic base) preferably is included in the additives package at a concentration of about 0.02 weight percent or more, more preferably about 0.1 weight percent or more, even more preferably about 0.5 weight percent or more, even more preferably about 1.0 weight percent or more, and most preferably about 1.5 weight percent or more, based on the total weight of the additives package, based on the total weight of the active ingredients in the additives package (i.e., the weight of the additives package less the weight of any water in the additives package), or both. Preferably, the base (e.g., the metallic base) is included in the additives package at a concentration of about 35 weight percent or less, preferably about 25 weight percent or less, more preferably about 12 weight percent or less, even more preferably about 8 weight percent or less, and most preferably less about 3.5 weight percent or less, based on the total weight of the additives package, based on the total weight of the active ingredients in the additives package (i.e., the weight of the additives package less the weight of any water in the additives package), or both. The concentration of the base (e.g., the metallic base) in the fluid composition preferably is about 0.1 ppt (pounds per thousand gallons of fluid) or more, more preferably about 0.5 ppt or more, even more preferably about 4 ppt or more, even more preferably about 6 ppt or more, and most preferably about 12 ppt or more. The concentration of the base (e.g., the metallic base) in the fluid composition preferably is about 100 ppt (pounds per thousand gallons of fluid) or less, more preferably about 50 ppt or less, even more preferably about 20 ppt or less, even more preferably about 12 ppt or less, and most preferably about 12 ppt or less.

If a metallic base and the metal halide salt are both employed, the weight ratio of the metallic base (e.g., the sodium hydroxide) to the metal halide salt (e.g., the potassium chloride) preferably is greater than about 1:100, more preferably greater than about 1:50, and most preferably greater than about 1:25. If employed, the weight ratio of the metallic base (e.g., the sodium hydroxide) to the metal halide salt (e.g., the potassium chloride) preferably is less than about 1:1, more preferably less than about 1:5, and most preferably less than about 1:10. For example the weight ratio of the metallic base to the metal halide salt may be about 1:9. Such proportions may also be employed for other bases (e.g., non-metallic bases) and/or salt (e.g., non-metal halide salt) combinations.

Cross-Link Retarder/Gluconate Salt

The additives package, the fluid composition or both may preferably includes one or more cross-link retarders capable of retarding the cross-linking of the gelling agent by the cross-linking agent. The cross-link retarder may delay the cross-linking reaction, reduce the rate of cross-linking (e.g., the initial rate of cross-linking), or both. The cross-link retarder may be employed so that the cross-linking reaction predominantly occurs when the fluid composition is in the subterranean structure (e.g., it may selectively retard the start of cross-linking until the fluid composition has reached the subterranean structure). Any cross-link retarder that is capable of delaying the build up in the viscosity of the fluid composition may be employed. For example, the cross-link retarder may include or consist essentially of one or more gluconate salts. Preferred gluconate salts that may be used include metal gluconates, such as alkali metal gluconates, alkaline earth metal gluconates, and combinations thereof. A particularly preferred gluconate salt that may be used is sodium gluconate.

The cross-linking retarder may be included in an additives package, in a fluid composition, or both at a concentration sufficient to delay the cross-linking of the fluid composition so that it can flow into the subterranean formation. Preferably the concentration of the cross-link retarder (e.g., the concentration of the one or more gluconate salts in the additives package is about 1 weight percent or more, more preferably about 2 weight percent or more, even more preferably about 4 weight percent or more, and most preferably about 7 weight percent or more, based on the total weight of the additives package, based on the total weight of the active ingredients in the additives package (i.e., the weight of the additives package less the weight of any water in the additives package), or both. Preferably the concentration of the cross-link retarder (e.g., the concentration of the one or more gluconate salts) in the additives package is about 35 weight percent or less, more preferably about 25 weight percent or less, even more preferably about 15 weight percent or less, and most preferably about 11 weight percent or less, based on the total weight of the additives package, based on the total weight of the active ingredients in the additives package (i.e., the weight of the additives package less the weight of any water in the additives package), or both. The concentration of the cross-link retarder (e.g., the total concentration of the one or more gluconate salts) in the fluid composition preferably is about 0.1 ppt (pounds per thousand gallons of fluid) or more, more preferably about 1 ppt or more, even more preferably about 5 ppt or more, even more preferably about 15 ppt or more, and most preferably about 20 ppt or more. The concentration of the cross-link retarder (e.g., the total concentration of the one or more gluconate salts) in the fluid composition preferably is about 150 ppt (pounds per thousand gallons of fluid) or less, more preferably about 80 ppt or less, even more preferably about 50 ppt or less, even more preferably about 40 ppt or less and most preferably about 35 ppt or less.

If a cross-link retarder and a metal halide salt are both employed, the weight ratio of the cross-link retarder (e.g., the gluconate salt, such as sodium gluconate) to the metal halide salt (e.g., the potassium chloride) preferably is greater than about 1:30, more preferably greater than about 1:15, and most preferably greater than about 1:10. If cross-link retarder and a metal halide salt are both employed, the weight ratio of the cross-link retarder (e.g., the gluconate salt, such as sodium gluconate) to the metal halide salt (e.g., the potassium chloride) preferably is less than about 2:1, more preferably less than about 1:2, and most preferably less than about 1:4. For example the weight ratio of the cross-link retarder to the metal halide salt may be about 1:6.

Gel Breaker/Metal Bromate

The additives package may optionally include one or more gel breakers, such as a gel breaker that is capable of reacting with the cross-linked gel to reduce its molecular weight. For example, the gel breaker may be capable of depolymerizing the cross-linked gelling agent, de-crosslinking the cross-linked gelling agent, or both. Without being bound by theory, the gel breaker make act as an oxidizer for controlling the rate of cross-linking, de-crosslinking, or both of the gelling agent. The gel breaker may be selected to depolymerize or de-crosslink at a relatively slow rate so that the viscosity of the fluid composition does not drop prematurely. The gel breaker preferably is a substance which has the ability to break the cross-linking bonds within the cross-linked gelling agent (for example by coordinating with the cross-linking agent) and preventing it from being further capable of coordination with functional groups along the polymer chains. Preferably, the gel breaker is provided as an encapsulated compound or a capped compound.

Any gel breaker known to those of ordinary skill in the art of compounding fluid compositions for fracturing subterranean formations may be employed. Without limitation, suitable gel breakers that may be employed include gel breakers and encapsulated gel breakers described in U.S. Pat. No. 4,770,796 (Jacobs, issued Sep. 13, 1988), U.S. Pat. No. 5,201,370 (Tjon-Joe-Pin, issued Apr. 13, 1993), U.S. Pat. No. 5,497,830 (Boles et al, issued Mar. 12, 1996), U.S. Pat. No. 6,265,355 (Lai et al, issued Jul. 24, 2001), U.S. Pat. No. 5,604,186 (Hunt et al, issued Feb. 18, 1997), U.S. Pat. No. 5,420,174 (Dewprashad, issued May 30, 1995), U.S. Pat. No. 6,133,204 (Newhouse et al., issued Oct. 17, 2000), all incorporated herein by reference in its entirety. There are various substances which are known to have such ability. These substances include compounds containing fluoride, phosphate or sulphate anions and polycarboxylated compounds such as ethylene diamine tetraacetic acid or its ammonium, alkali or alkaline earth metal salts. Preferably, substances containing fluoride anions are used as breakers in the present invention, such substances including, for example, fluorspar, cryolite, fluorosilicates, fluoroborates and other naturally occurring minerals containing the fluoride anion in the crystalline structure. Phosphates and sulphates which may be used as gel breakers include the alkali and alkaline earth metal phosphates and sulphates.

The gel breaker may be a pH adjusting breaker. The gel breaker may include or consist essentially of a metal bromate, calcium oxide, calcium hydroxide, sodium carbonate, an amine, an acid, or a peroxide. For example, the gel breaker may include or consist essentially of one or more bromine containing compound, such as one or more metal bromates. Without limitation, the metal bromate may include one or more metals such an alkali metal, an alkaline earth metal, a transition metal or any combination thereof. For example, the metal bromate may include one, two, or more metals selected from the group consisting of sodium, calcium, potassium, barium, and magnesium. The metal bromate may include, consist essentially of (e.g., at least 70 wt. %, preferably at least 90 wt. % based on the total weight of the metal bromate), or consist entirely of sodium bromate. Preferred peroxides include metal peroxides. More preferred peroxides include one or more alkali metals, one or more alkaline earth metals, or both. More preferred peroxides include calcium peroxide and magnesium peroxide.

If employed, the amount of gel breaker may be sufficient to break enough cross-links in the cross-linked gelling agent so that the gelling agent is capable of flowing, is capable of solvation, or both. The gel breaker, if employed, may be used in a fluid composition at a concentration of about 0.02 ppt (pounds per thousand gallons of fluid) or more, preferably about 0.05 ppt or more, more preferably about 0.1 ppt or more, even more preferably about 0.2 ppt or more, and most preferably about 0.5 ppt or more. The gel breaker, if employed, may be used in a fluid composition at a concentration of about 66 ppt (pounds per thousand gallons) or less, preferably about 33 ppt or less, more preferably about 20 ppt or less, even more preferably about 20 ppt or less, even more preferably about 10 ppt or less, and most preferably about 4 ppt or less.

Preferably the gel breaker is initially in a form that will not react with the gelling agent, the cross-linked gelling agent or the boron containing compound, or any combination thereof, or will react slowly. For example, the gel breaker or a precursor to the gel breaker may be encapsulated so that initially at least some of the gel breaker is separated from the gelling agent (e.g., separated by at least a membrane). The thickness, and permeability, of the membrane of the breaker can be adjusted, by known techniques, to provide any desired release rate of breaker. If encapsulated in a particle, the gel breaker may have a mesh size sufficiently small that it may be dispersed in the subterranean formation. The encapsulated gel breaker may have a particle size sufficiently large so that it can be easily manufacturing, contain a generally large amount of gel breaker, or both. The encapsulated breaker preferably includes or consists essentially of particles having a mesh size of about 10 or more, more preferably about 20 or more, even more preferably about 40 or more, and most preferably about 60 or more. The encapsulated breaker preferably includes or consists essentially of particles having a mesh size of about 325 or less, more preferably greater than about 200 or less, even more preferably about 150 or less, and most preferably about 100. The breaker may be encapsulated by known techniques, such as a fluidized bed process, or interfacial polymerization. The average diameter of the particles of the encapsulated gel breaker may be greater than about 1 μm, preferably greater than about 10 μm, more preferably greater than about 30 μm, and most preferably greater than about 100 μm. The average diameter of the particles of the encapsulated gel breaker may be less than about 2,000 μm, preferably less than about 1,000 μm, more preferably less than about 700 μm, and most preferably less than about 500 μm.

Diluent/Alcohol

The additives package (e.g., for use in a fluid compound) may optionally include one or more diluents, such as one or more organic diluents, such as one or more alcohols. Without being bound by theory, it is believed that the alcohol provides fluidity for the fluid composition such that it may be used over a wide range of temperatures. Additionally, it is believed that the alcohol may react with one, or more containing from about 1 to about 20 carbon atoms, preferably one or more alcohols containing from about 1 to about 10 carbon atoms, and most preferably one or more alcohols containing from about 1 to about 5 carbon atoms. The alcohol may contain one, two, or more hydroxyl groups. For example, the alcohol may include, consist essentially of, or consist entirely of one or more diols, such as a diol selected from the group consisting of ethylene glycol, propylene glycol, a derivative thereof, and any combination thereof. The alcohol may contain one hydroxyl group, such as methanol, ethanol, n-propanol, 2-propanol, n-butanol, 2-butanol, isopropanol, or any combination thereof. A particularly preferred alcohol that may be used alone or in combination with one or more other alcohols is isopropanol.

The diluent (e.g., the alcohol) may be included in the additives package at a concentration greater than about 0.1 wt. %, preferably greater than about 0.5 wt. %, more preferably greater than about 2 wt. %, even more preferably greater than about 4 wt. % and most preferably greater than about 5 wt. % based on the total weight of the additives package. The diluent (e.g., the alcohol) may be included in the additives package at a concentration less than about 50 wt. %, preferably less than about 25 wt. %, more preferably less than about 20 wt. %, even more preferably less than about 15 wt. % and most preferably less than about 10 wt. % based on the total weight of the additives package.

The diluent (e.g., the alcohol) may be included in the fluid composition at a concentration greater than about 0.05 gpt (gallons per thousand gallons of fluid), preferably greater than about 0.5 gpt, more preferably greater than about 1 gpt, even more preferably greater than about 2 gpt and most preferably greater than about 5 gpt based on the total volume of the fluid composition. The diluent (e.g., the alcohol) may be included in the fluid composition at a concentration less than about 200 gpt, preferably less than about 100 gpt, more preferably less than about 40 gpt, even more preferably less than about 20 gpt and most preferably less than about 15 gpt based on the total volume of the fluid composition.

The additives package, the fluid composition, or both may further include one or more art known proppants (such as sand or ceramic beads), and/or one or more fluid loss additives (such as a mixture including silica flour, starch, or both).

The fluid composition, the additives package, or both may be water based. It may be free of volatile organics.

The boron containing compound (e.g., the boron salt) may be present in the fluid composition as a suspension.

Fluid Composition

The additive compositions taught herein may be employed in a fluid composition that includes at least 50 wt. % of a liquid carrier. Preferably the liquid carrier includes, consists essentially of, or consists entirely of water.

The fluid composition preferably has a relatively good shear stability (initial shear stability, long term shear stability, or both) at one or more elevated temperatures, (e.g., at a temperature of about 107° C., about 121° C., about 135° C., about 143° C., or about 149° C.). A relatively good initial shear stability may be indicated by an increase in the viscosity of the fluid composition of at least 50%, preferably at least about 100%, and more preferably at least about 200%, when the shear rate is decreased from about 950 s$^{-1}$ to about 100 s$^{-1}$ after being at the elevated temperature for at least 2 minutes (e.g., for about 5 minutes). A relatively good long term shear stability may be indicated by an increase in the viscosity of the fluid composition of at least 10%, preferably at least about 50%, and more preferably at least about 100%, when the shear rate is decreased from about 100 s$^{-1}$ to about 30 s$^{-1}$ after being at the elevated temperature for at least 20 minutes (e.g., for about 25 minutes, for about 45 minutes, for about 70 minutes, for about 93 minutes, or for at least about 120 minutes).

The fluid composition may also have a relatively high ratio of the viscosity after being exposed to high temperatures ($v_t$) in the rheometer for a exposure time of about 1 hour, about 2 hours, about 3 hours, or about 4 hours to the initial viscosity, $v_i$. For example the fluid composition may have an initial viscosity at a shear rate of about 100 s$^{-1}$ of at least 100 cP, preferably at least about 300 cP, more preferably at least about 500 cP. After the exposure time at an elevated temperature of about 107° C., about 121° C., about 135° C., about 143° C., or about 149° C., the fluid composition has a ratio of $v_t/v_i$ that may be greater than about 20%, preferably greater than about 40%, more preferably greater than 50%, and most preferably greater than 70%. For example, the fluid composition may be characterized by a ratio of $v_t/v_i$ that is greater than about 50% after a test time of 3 hours at 143° C.

The fluid composition may also be characterized as having a high viscosity retention time, as measured by the time required for the viscosity to drop below a viscosity value of 400 cP, 500 cP, or 600 cP, measured while the shear rate is about 100 1/s. For example the viscosity retention time for the viscosity to drop below a value of 400 cP, 500 cP, 600 cP, or any combination thereof, may be greater than 60 minutes, preferably greater than 90 minutes, more preferably greater than about 100 minutes, even more preferably greater than about 120 minutes, even more preferably greater than about 150 minutes, even more preferably greater than about 180 minutes, and most preferably greater than about 240 minutes.

Though acidic compositions may be employed, the fluid composition generally will be selected to be generally alkaline. For example, it may have a pH (measured e.g., according to ASTM D1293-99) preferably greater than about 10, more preferably greater than about 10.5, even more preferably greater than about 11, and most preferably greater than about 11.4. The fluid composition may be selected to have a pH less than about 13.5, preferably less than about 13, more preferably less than about 12.7, and most preferably less than about 12.4.

Other Ingredients

It will be appreciated that the additives package, the fluid composition, or both, may include one or more additional ingredients. For example, the additives package, the fluid composition, or both may include one or more defoaming agents, one or more surfactants, one or more biocides, one or more microemulsion additive, or any combination thereof.

Alkyl ether organic acid esters may be included in drilling and other formation treatment fluids used in hydrocarbon production to provide a demulsifying and defoaming action on foams and emulsions in the producing formation. The action of the compositions is time and temperature dependent and therefore their action can be controlled in situ.

The additives package, the fluid composition, or both, may optionally include one or more defoaming agents capable of demulsifying and/or defoaming the composition. A defoaming agent may be particularly advantageous when mixing the composition or a portion of the composition in a surface tank. For example, a defoaming agent may be selected so that it is capable of preventing foaming of a composition prior to being injected into a well, allowing foaming of a composition in a well, or preferably both. A defoaming agent preferably is employed in compositions that include one or more surfactants that function for retarding foaming, one or more emulsions (e.g., one or more micro-emulsive additives), or both. Where surfactants are included with the fluids, foaming is likely to occur. Frequently surfactants are added to reduce surface tension within the rock matrix, control wettability generate foam to assist in removing the particulate products of drilling, or for other purposes. For example, a surfactant may be employed to improve the wettability between components of the fluid composition, between the fluid composition and the subterranean formation, or both. Emulsions may be added deliberately, but also they may be generated due to the pressure and mixing of the fluids with the subterranean hydrocarbons (i.e., the oil and gas being recovered). In most cases it is not desirable for emulsions to be formed, since the emulsion will have to be broken after recovery in a separate, time-consuming step, they may seal the fractured formation and prevent recovery of the subterranean hydrocarbons. The defoaming agent may be include any art known compound capable of breaking foams and/or emulsions. Without limitation, suitable defoaming agents include defoamers described in U.S. Pat. No. 7,348,297 (Smith et al., issued Mar. 25, 2008), and U.S. Pat. No. 7,150,322 (Szymanski et al., issued Dec. 19, 2006), and U.S. Patent Application Publication Nos., 2006/0260815 A1 (Dahanayake et al., published Apr. 6, 2006), and 2007/0054968 A1 (Scoggins, published Aug. 23, 2005), all incorporated herein by reference in their entirety. The defoaming agent may include or consist essentially of a compound of the formula $H(CH_2)_zCOO[C_2H_4O]_xC_yH_{2y+1}$, or of the formula $H(CH_2)_zCOO[C_2H_4O]_xC_6H_5$, where z is 0-2, x is an integer from 1 to 5 and y is an integer from 4-9. The defoaming agent may include or consist essentially of a lecithin, such as a natural lecithin (e.g., from soybeans) or a synthetic lecithin. The defoaming agent may include a phospholipid. Preferred phospholipids include phosphatidylcholine, phosphatidylethanolamine, and phosphatidylinositol.

The additives package, the fluid composition, or both may optionally include one or more surfactants that function to disperse one or more liquid, solid, or gaseous components. The surfactant may be ionic (e.g., anionic, cationic, or amphiphilic), or nonionic. Without limitation, suitable surfactants includes surfactants described in U.S. Pat. No. 7,150, 322 (Szymanski et al., issued Dec. 19, 2006), U.S. Pat. No. 5,566,760 (Harris, issued Oct. 22, 1996), and U.S. Pat. No. 6,966,379 (Chatterji et al, issued Nov. 22, 2005), all incorporated herein by reference in their entirety. The surfactant may be a soap-like molecules containing a long hydrophobic paraffin chain with a hydrophilic end group. Surfactants include cationic, anionic, nonionic or amphoteric compounds such as for example, betaines, sulfated or sulfonated alkoxylates, alkyl quarternary amines, alkoxylated linear alcohols, alkyl sulfonates, alkyl aryl sulfonates, $C_{10}$-$C_{20}$ alkyldiphenyl ether sulfonates, and the like, and any combination thereof. Examples of surfactants include polyethylene glycols, ethers of alkylated phenol, sodium dodecylsulfate, alpha olefin sulfonates such as sodium dodecane sulfonate and trimethyl hexadecyl ammonium bromide. The surfactant may include or consist of one or more nonionic surfactant. Preferred nonionic surfactants have a generally low hydrophile-lipophile balance ("HLB") values. Commercially available nonionic surfactants include, but are not limited to, ENVIROGEM™ AE01, ENVIROGEM™ AE02, and ENVIROGEM™ AE03 available from Air Products and Chemicals, Inc., of Allentown, Pa., and RHODOCLEAN™ HP, available from Rhodia Inc. of Cranbury, N.J. The surfactant may include a tertiary alkyl amine ethoxylates. Nonlimiting examples of amphoteric surfactants that may be used include lauryl amine oxide, a mixture of lauryl amine oxide and myristylamine oxide, cocoamine oxide, lauryl betaine, oleyl betaine, cocoamido propyl betaine, or combinations thereof.

The additives package, the fluid composition, or both may optionally include one or more biocides. The biocide may be included in the treatment fluids of the present invention to reduce the bioburden of the fluid so as to avoid introducing an undesirable level of bacteria into the subterranean formation. The biocide may be used to kill microorganisms that may deleteriously affect the well, the polymers or other ingredients in the fluid composition, the hydrocarbons being recovered, or any combination thereof. Preferred are capable of killing one or more bacterial. Particularly preferred biocides are capable of killing general heterotopic bacteria (GHB), acid producing bacteria (APB), sulfate reducing bacteria (SRB) bacteria, or any combination thereof. Without being bound by theory, it is believed that GHB and APB are aerobic bacteria that cause issues in the oilfield like corrosion or loss of viscosity in biopolymer fluids. Without being bound by theory, it is believed that anaerobic sulphate reducing bacteria (SRB's) will sour the well and are of particular concern. Particularly preferred biocides are effective at controlling SRB, GBH, and APB. An exemplary biocide that is effective at controlling SRB, GBH, and APB is glutaraldehyde. Without limitation, suitable biocides include biocides described in U.S. Pat. No. 4,552,591 (Millar et al., issued Nov. 12, 1985), U.S. Pat. No. 6,001,158 (Elphingstone et al., issued Dec. 14, 1999), U.S. Pat. No. 5,016,714 (McCabe et al., issued May 21, 1991), and U.S. Patent Application Publication Nos. 2008/0119375A1 (Barmatov et al., published May 22, 2008), 2009/0229827 A1 (Bryant et al., published Mar. 14, 2008), US 2004/0120853 A1 (Carpenter et al., published Jun. 24, 2004), 2008/0004189 A1 (Smith et al., published Jan. 3, 2008), and 2008/0032903 A1 (Starkey et al., published Feb. 7, 2008), all incorporated herein by reference in their entirety. The biocide may include or consist essentially of formaldehyde, p-formaldehyde, glutaraldehyde, triazines, thiones, hydroxyalkylaminoalkanols, e.g. 2-hydroxymethyl-amino methanol, thiocarbamates, thiocyanates, isothiazolones, and the like, or any combination thereof. Examples of isothiazolin-3-ones that may be used include 2-methyl-4-isothiazolin-3-one, 2 ethyl-4-isothiazolin-3-one, 2-propyl-4-isothiazolin-3-one, 2-butyl-4-isothiazolin-3-one, 2-amyl-4-isothiazolin-3-one, 5-chloro-2-methyl-4-isothiazolin-3-one, 5-bromo-2-methyl-4-isothiazolin-3-one, 5-iodo-2-methyl-4-isothiazolin-3-one, 5-chloro-2-butyl-4-isothiazolin-3-one, 5-bromo-2-ethyl-4-isothiazolin-3-one, 5-iodo-2-amyl-4-isothiazolin-3-one and similar analogs and homologs within the genus. Preferred isothiazolin-3-ones that may be used alone or in any combination include isothiazolin-3-ones wherein the 2 position is substituted by an alkyl group having from about 1 to about 5 carbon atoms, especially from about 1 to about 3 carbon atoms, preferably 1 carbon atom and wherein the five position may be substituted by a halogen group, for example iodo, chloro and bromo, especially chloro. The biocides may include an oxidizing biocides, a nonoxidizing biocides, or both. Examples of oxidizing biocides may include sodium hypochlorite, hypochlorous acid, chlorine, bromine, chlorine dioxide, and hydrogen peroxide. Examples of non-oxidizing biocides may include aldehydes (such as formaldehyde and glutaraldehyde), quaternary amines, isothizaolines, carbamates, phosphonium quaternary compounds, and halogenated compounds (such as dibromonitrilopropionamide and bromonitropropanediol). Examples of suitable biocides may include those commercially available from Halliburton Energy Services Inc., in Duncan, Okla., under the trade names ALDACIDE™ G, ALDACIDE™ BE-3. ALDACIDE™ BE-6 and ALDACIDE™ BE-7. Factors that determine what biocide will be used in a particular application may include but are not limited to, the cost and performance characteristics of the biocide. An additional factor that may be considered is the kill time of the biocide of the biocide. For example, a biocide with a kill time of less than 5 minutes may be more desirable than a biocide with a kill time of 30 minutes. Other factors that may be considered are costs, compatibility with friction reducers, environmental compatibility, and regional drilling practices. One skilled in the art with the benefit of this disclosure will be able to choose a suitable biocide for a particular application in view of these considerations.

The additives package, the fluid composition, or both may include one or more art known microemulsion additives. Without limitation, suitable micoremulsion additives that may be employed include microemulsions described in U.S. Pat. No. 4,650,000 (Andreasson et al., issued Mar. 17, 1987), U.S. Pat. No. 5,310,002 (Blauch et al., issued May 10, 1994), U.S. Pat. No. 5,478,860 (Wheeler et al, issued Dec. 26, 1995), and U.S. Pat. No. 4,192,753 (Pye et al., published Mar. 11, 1980), and U.S. Patent Application Publication Nos. 2008/0066918 A1 (Smith, published Mar. 20, 2008), 2005/0209107 A1 (Pursely et al., issued Sep. 22, 2005), and 2007/0123431 A1 (Jones et al, published May 31, 2007), all incorporated herein by reference in their entirety.

It will be appreciated that the additives package may be provided as one, two, three, or more components. For example, the additives package may include a plurality of components including a component containing a gelling agent, a component containing a cross-linking agent, a component, a component containing an activator, or any combination thereof. Preferably, the gelling agent and boron containing compound are provided in different components. As such, the additives package may be provided as a kit including two, three, or more components. In a preferred aspect of the invention, the additives package is provided as a kit including two, three or more components so that the ratios of the components can be varied depending on the fracturing conditions (e.g., the type of subterranean formation, the temperature of the subterranean formation, or both). As such, the additives package may be part of a kit that includes one or more of the functional ingredients and which may be capable of being used at a relatively large range of temperatures. For example, a single kit may be capable of being used in fluid compositions for fracturing subterranean formations having a temperature of about 130° C. or less, formations having a temperature from about 130° C. to about 140° C., formations having a temperature from about 140° C. to about 150° C., formations having a temperature from about 150° C. to about 160° C., formations having a temperature from about 160° C. to about 170° C., formations having a temperature from about 170° C. to about 180° C., formations having a temperature from about 180° C. to about 190° C., formations having a temperature greater than about 190° C. (e.g., formations having a temperature from about 190° C. to about 200° C.), or any combination thereof. It is also possible that one or more ingredients of an additives package may be provided separately from the other ingredients and combined with one or more other ingredients of the additives package (e.g., combined in a fluid composition) prior to the fluid contacting the subterranean structure. For example, one or more ingredients of the additives package may be combined with one or more other ingredients of the additives package prior to, during, or after the addition of the other ingredients to a diluent fluid.

Process

The additives package and fluid compositions may be beneficially used in a process for fracturing a subterranean structure, stabilizing a fractured structure, or preferably both.

The process may be characterized by a fluid efficiency (i.e., the percentage of the fluid composition used in the fracturing process that is contained in the fracture, and does not leak off) greater than about 25%, preferably greater than about 40%, more preferably greater than about 60%, even more preferably greater than about 70%, and most preferably greater than about 80%).

The process may be characterized by a regained permeability (i.e., the percent of the guar gel recovered from the fracturing process) at a temperature of about 149° C. of at least about 30%, preferably at least about 60%, more preferably at least about 70%, even more preferably at least about 75%, and most preferably at least about 80%.

The process may surprisingly be used for subterranean formations having a wide range of temperatures. For example the process may include a step of inserting the fluid composition, such as a fluid composition including an additives package described herein, into a subterranean formation having a temperature of about 130° C. or less, a formation having a temperature from about 130° C. to about 140° C., a formation having a temperature from about 140° C. to about 150° C., a formation having a temperature from about 150° C. to about 160° C., a formation having a temperature from about 160° C. to about 170° C., a formation having a temperature from about 170° C. to about 180° C., a formation having a temperature from about 180° C. to about 190° C., a formation having a temperature greater than about 190° C. (such as a formation having a temperature from about 190° C. to about 200° C.), or any combination thereof. Preferably, the process includes a step of providing the fluid composition to a subterranean formation having one or more temperatures of about 140° C. or more, more preferably about 150° C. or more, even more preferably about 160° C. or more, even more preferably about 170° C. or more, even more preferably about 180° C. or more, and most preferably about 190° C. or more.

The fluid compositions and additives packages described herein may be used in a step of recovering a hydrocarbon (e.g., recovering an oil, a gas, or both). The process may include a step of fracturing a subterranean formation using a fluid composition described herein. The process may include a step of fracturing a subterranean formation using an additives package described herein. The process may include a step of injecting a fluid composition (e.g., a fluid composition as described herein, such as a fluid composition containing an additives package described herein) into a subterranean formation. The process preferably include a step of pumping a fluid composition to a depth of about 1 kilometer or more, more preferably about 2 kilometers or more, even more preferably about 4 kilometers or more, and most preferably about 6 kilometers or more. The process may include a step of separating a hydrocarbon from water. The process may include a step of pumping a hydrocarbon out of a well. The process may include a step of combining an additives package with water (e.g., to form a fluid composition). The process may include a step of combining an additives package with water in a well head. The process may include a step of continuously mixing an additives package with water. The process preferably include a step of combining the ingredients of a fluid composition (e.g., a step of mixing an additives with water), wherein the time between the combining step and a step of injecting the fluid composition into a subterranean formation is less than 1 day, preferably less than 6 hours, more preferably less than about 1 hour, even more preferably less than about 10 minutes, and most preferably less than about 1 minute. The process may include a step of injecting the fluid composition into a subterranean formation. The process may include a step of recovering a petroleum containing material and/or a hydrocarbon gas containing material from the formation. The process may include one or more additional steps of: fractionating a petroleum containing material and/or a hydrocarbon gas containing material into a plurality of fractions (such as a liquefied petroleum gas fraction, a naphtha fraction, a gasoline fraction, a kerosene fraction, a diesel oil fraction, a lubricating oil fraction, a fuel oil fraction, a residue fraction, or any combination thereof). The process may include one or more steps of refining one or more of such fractions. The process may include one or more steps of reacting a petroleum containing materials, a hydrocarbon gas containing material, or one or more fractions (e.g., to form a polymeric material or a precursor thereof). The process may include one or more steps of cracking (e.g., hydrocracking and/or fluid catalytic cracking) a petroleum containing materials, a hydrocarbon gas containing material, or one or more fractions. The process may include one or more steps of hydrotreating a petroleum containing materials, a hydrocarbon gas containing material, or one or more fractions. The process may include one or more steps of platforming (e.g., over a platinum-containing catalyst) a petroleum containing materials, a hydrocarbon gas containing material, or one or more fractions (e.g., to produce reformate and hydrogen). The process may include one or more steps of isomerizing a petroleum containing materials, a hydrocarbon gas containing material, or one or more fractions. The process may include one or more steps of alkylating a petroleum containing materials, a hydrocarbon gas containing material, or one or more fractions. The process may include one or more steps of purifying a petroleum containing materials, a hydrocarbon gas containing material, or one or more fractions monomer, or a product therefrom (e.g., for manufacturing a lubricant, a monomer, a solvent, a fuel, or any combination thereof). The process may include one or more steps of polymerizing one or more monomers.

The recovered materials (e.g., the petroleum containing materials and/or the hydrocarbon gas containing material) and/or the one or more fractions may be used for manufacturing a petroleum based material. Examples of such petroleum based materials include fuesl (e.g., a gasoline, a kerosene, a heating oil, a diesel fuel, or any combination thereof), lubricants, functional fluids, cleaners, solvents, coatings, construction material, asphalts, monomers, prepolymers, and polymers. By way of example, such products may be a polymeric article (e.g., a shaped article made by processing a polymeric material derived from a fracturing process herein).

EXAMPLES

Example 1

A fluid composition is prepared by mixing water with about 167 pounds per thousand gallons of total fluid (i.e., ppt) of potassium chloride, about 40 ppt hydroxyl propyl guar, about 9 ppt sodium hydroxide, about 30 ppt sodium gluconate, about 40 ppt sodium thiosulfate, and about 5 gallons per thousand gallons of fluid (i.e., gpt) of a boron salt.

Example 2

A fluid composition is prepared by mixing water with about 167 pounds per thousand gallons of total fluid (i.e., ppt) of potassium chloride, about 40 ppt hydroxyl propyl guar, about 9 ppt sodium hydroxide, about 25 ppt sodium gluconate, about 35 ppt sodium thiosulfate, and about 5 gallons per thousand gallons (i.e., gpt) of a boron salt.

Example 3

A fluid composition including the fluid composition of Example 1 is mixed with about 1 ppt of a sodium borate. The solution is evaluated in a rheometer at a temperature of about 149° C. (about 300° F.). The rheometer (a Grace High Temperature High Pressure rheometer) allows for testing at water based compositions at temperatures above 100° C., by using nitrogen to maintain an elevated pressure. A pressure of about 400 psi is maintained in the cylinder containing the test fluid. The initial shear rate is about 650 $s^{-1}$ and is increased to about 950 $s^{-1}$ at a time of about 6 minutes (about when the fluid reaches a temperature within about 5° C., preferably within about 2° C. of the test temperature). After about 8 minutes the shear rate is reduced to about 100 $s^{-1}$. The shear rate is maintained at 100 $s^{-1}$, except for short reductions (e.g., about 3 minutes in duration) in the shear rate to about 30 $s^{-1}$ every 20 to 30 minutes. Thus evaluated, the initial viscosity of the fluid composition (e.g., after about 7 minutes and while the shear rate is about 950 $s^{-1}$) is about 225 cP. When the shear rate decreases to about 100 $s^{-1}$, the viscosity of the fluid composition increases to over 800 cP (e.g. about 900 cP). At about 20 minutes, the viscosity is about 510 cP. At about 25 minutes, when the shear rate is reduced to about 30 $s^{-1}$, the viscosity increases from about 430 cP to about 570 cP. The viscosity continues to drop at a relatively low rate and is about 140 cP after about 40 minutes, and 100 cP at about 60 minutes. The viscosity, shear rate, and temperature of EXAMPLE 3 as a function of time are shown in FIG. 1.

Example 4

A fluid composition including the fluid composition of Example 1 is mixed with about 2 ppt of a sodium borate.

Figure 2:
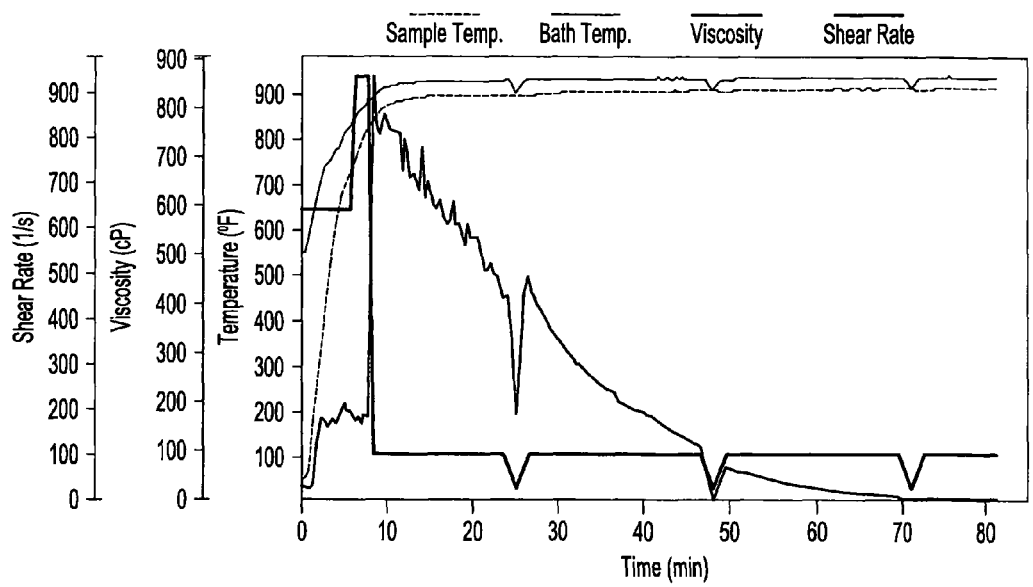
FIG. 2 is an illustrative rheometer curve expected for a fluid composition tested at about 149° C. (about 300° F.).

Example 4 is tested using the same method as described for Example 3. At about 7 minutes, the viscosity of Example 4 is about 160 cP. The viscosity increases to about 800 cP when the shear rate is reduced to about 100 s$^{-1}$. At about 20 minutes, the viscosity of the fluid composition is about 520 cP. At about 25 minutes, when the shear rate decreases from about 100 to about 30 s$^{-1}$, the viscosity increases from about 390 cP to about 470 cP. After about 40 minutes the viscosity is about 170 cP and after about 60 minutes, the viscosity is about 20 cP. The viscosity, shear rate, and temperature of EXAMPLE 4 as a function of time are shown in FIG. 2.

Example 5

Figure 3:
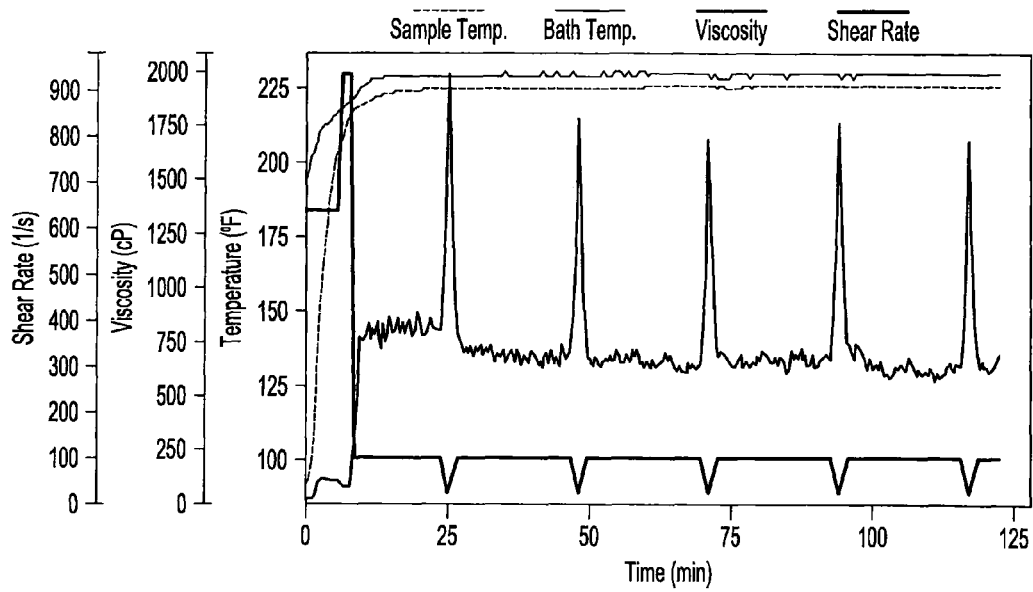
FIG. 3 is an illustrative rheometer curve expected for a fluid composition tested at about 107° C. (about 225° F.).

A fluid composition including the fluid composition of Example 1 is mixed with about 1 ppt of a sodium borate. Example 5 is tested using the same method as described for Example 3, except the test temperature is about 107° C. (about 225° F.). At about 7 minutes, the viscosity of Example 5 is about 120 cP. The viscosity increases to about 800 cP when the shear rate is reduced to about 100 s$^{-1}$. At about 20 minutes, the viscosity of the fluid composition is about 800 cP. At about 25 minutes, when the shear rate decreases from about 100 to about 30 s$^{-1}$, the viscosity increases from about 800 cP to about 2000 cP. After about 40 minutes the viscosity is about 650 cP, after about 60 minutes the viscosity is about 650 cP and after about 110 minutes, the viscosity is about 600 cP. The viscosity, shear rate, and temperature of EXAMPLE 5 as a function of time are shown in FIG. 3.

Example 6

Figure 4:
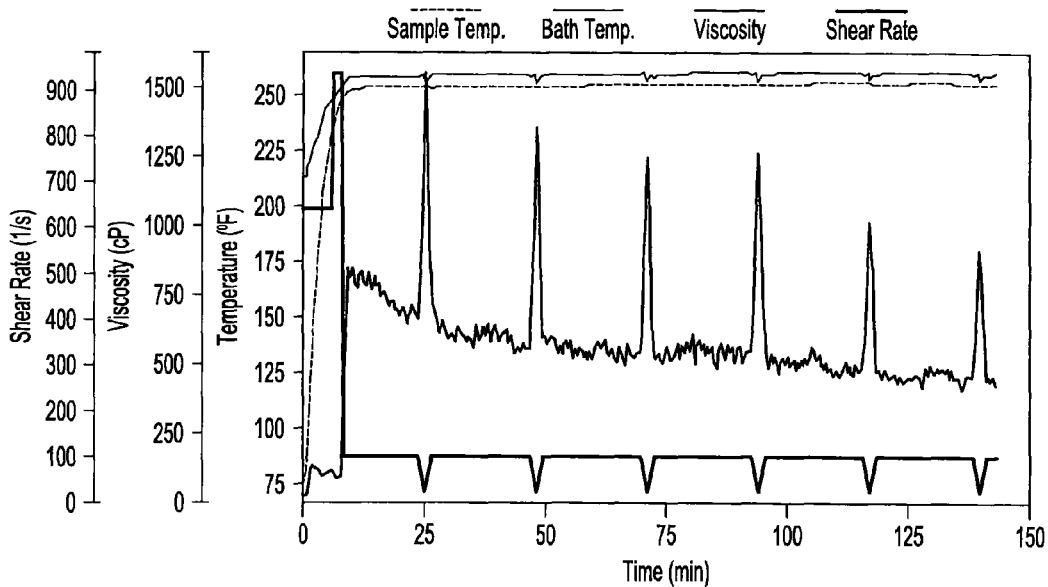
FIG. 4 is an illustrative rheometer curve expected for a fluid composition tested at about 121° C. (about 250° F.).

A fluid composition including the fluid composition of Example 1 is mixed with about 1 ppt of a sodium borate. Example 6 is tested using the same method as described for Example 3, except the test temperature is about 121° C. (about 250° F.). At about 7 minutes, the viscosity of Example 6 is about 100 cP. The viscosity increases to about 780 cP when the shear rate is reduced to about 100 s$^{-1}$. At about 20 minutes, the viscosity of the fluid composition is about 650 cP. At about 25 minutes, when the shear rate decreases from about 100 to about 30 s$^{-1}$, the viscosity increases from about 650 cP to about 1500 cP. After about 40 minutes the viscosity is about 580 cP, after about 60 minutes the viscosity is about 520 cP and after about 110 minutes, the viscosity is about 510 cP. The viscosity, shear rate, and temperature of EXAMPLE 6 as a function of time are shown in FIG. 4.

Example 7

Figure 5:
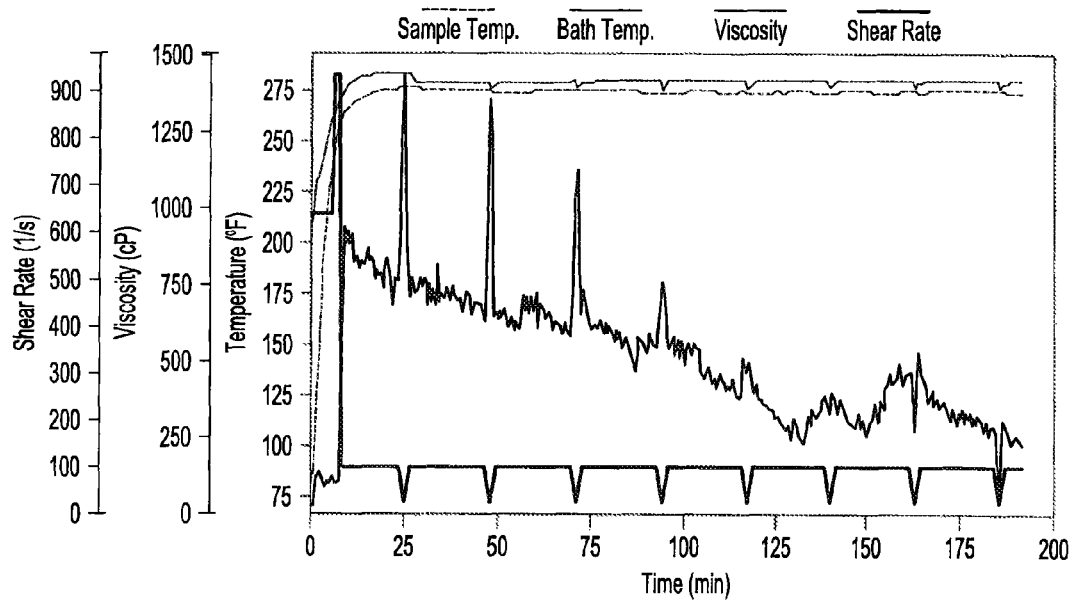
FIG. 5 is an illustrative rheometer curve expected for a fluid composition tested at about 135° C. (about 275° F.).

A fluid composition including the fluid composition of Example 1 is mixed with about 2 ppt of a sodium borate. Example 7 is tested using the same method as described for Example 3, except the test temperature is about 135° C. (about 275° F.). At about 7 minutes, the viscosity of Example 7 is about 110 cP. The viscosity increases to about 880 cP when the shear rate is reduced to about 100 s$^{-1}$. At about 20 minutes, the viscosity of the fluid composition is about 800 cP. At about 25 minutes, when the shear rate decreases from about 100 to about 30 s$^{-1}$, the viscosity increases from about 750 cP to about 1380 cP. After about 40 minutes the viscosity is about 710 cP, after about 60 minutes the viscosity is about 670 cP, and after about 110 minutes, the viscosity is about 440 cP, and after about 180 minutes, the viscosity is about 270 cP. The viscosity, shear rate, and temperature of EXAMPLE 7 as a function of time are shown in FIG. 5.

Example 8-21

Examples 8-21 are fluid composition prepared by mixing hydroxyl propyl guar, sodium hydroxide, sodium gluconate, sodium thiosulfate, sodium borate, and triethanolamine with water at the concentrations given in Table 1A and 1B. Examples 8-21 are tested using a rheometer using the method described for Example 3, except the test temperature is about 143° C. (about 290° F.) and test times up to about 280 minutes were employed.

Figure 6:
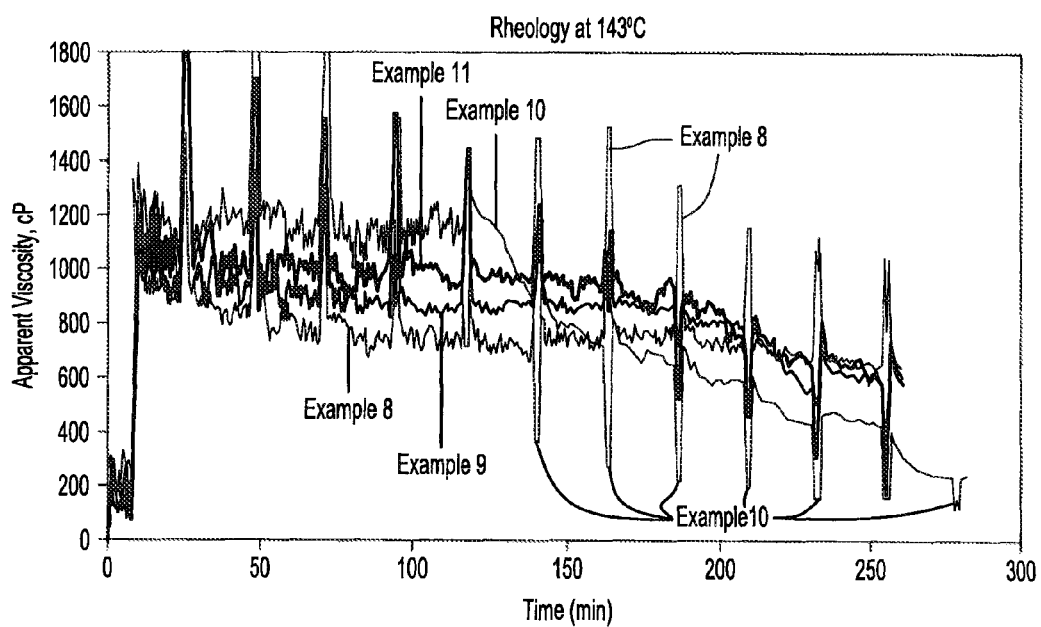
FIG. 6 is an illustrative rheometer curve expected for a fluid composition tested at about 143° C. (about 290° F.).

Illustrative expected viscosity curves for Examples 8-11 are shown in FIG. 6. These four samples all include triaethanolamine. During the first three hours of the test (at about 143° C.), the viscosity remains above 600 cP (i.e., above 50% of the initial viscosity) for all of the examples. During the first four hours of the test, the viscosity remains above 50% of the initial viscosity for Examples 8, 9, and 11.

Figure 7:
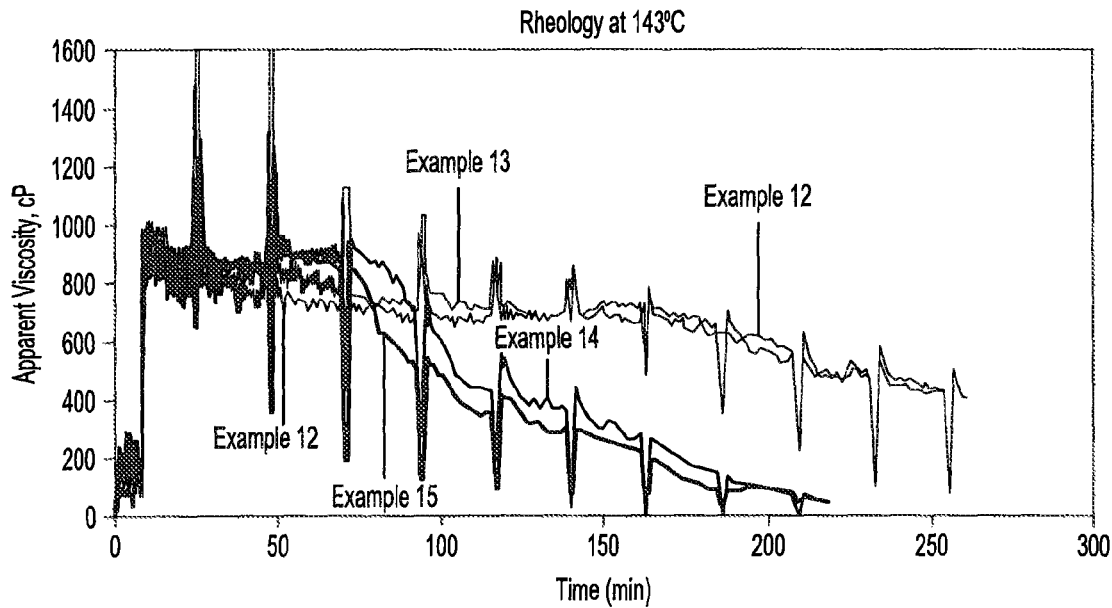
FIG. 7 is a rheometer curve expected for 3 fluid compositions illustrating some of the benefits of including an amine.

Illustrative expected viscosity curves for Examples 12-15 are shown in FIG. 7. During the first hour of the test 9 (at about 143° C.), the viscosity remains above 700 cP (i.e., above 80% of the initial viscosity) for all of the examples. During the first three hours of the test, the viscosity remains above 50% of the initial viscosity for Examples 12 and 13. Examples 12 and 13 include triethanolamine, whereas Examples 14 and 15 are free of amines.

Figure 8:
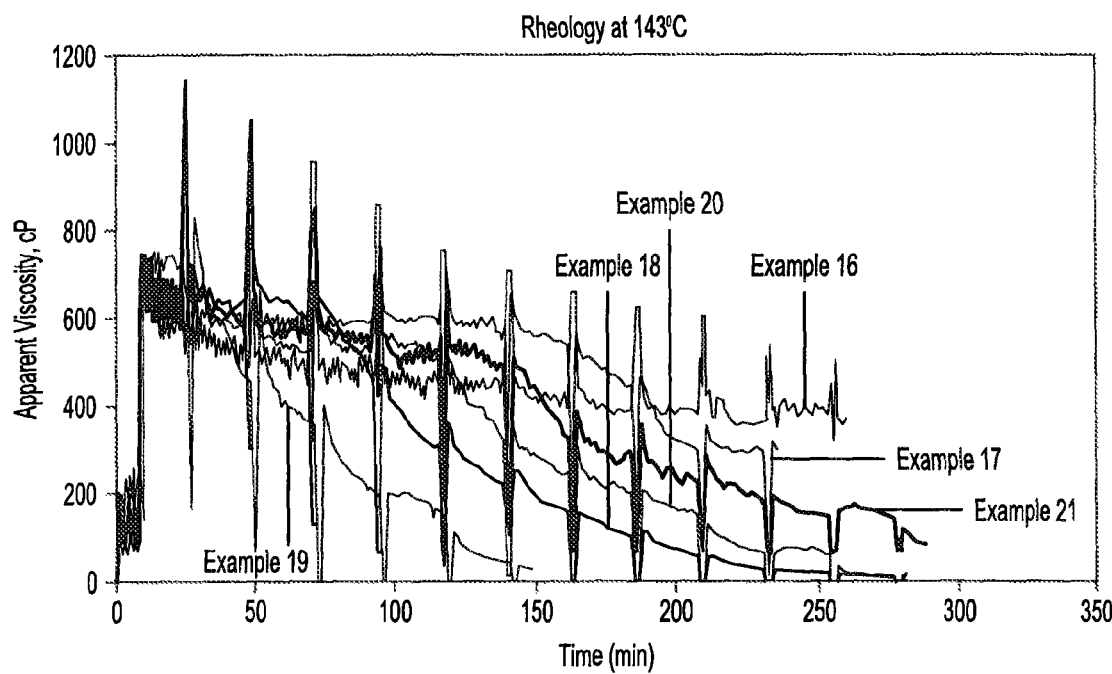
FIG. 8 is a rheometer curve expected for 6 fluid compositions including compositions containing an amine and compositions that are free of an amine.

Illustrative expected viscosity curves for Examples 16-21 are shown in FIG. 8. During the first hour of the test (at about 143° C.), the viscosity remains above about 425 cP (i.e., above about 70% of the initial viscosity) for Examples 16-18, and 20-21. During the first three hours of the test, the viscosity remains above 50% of the initial viscosity for Examples 16 and 17. Examples 16 and 17 include triethanolamine, whereas Examples 18-21 are free of amines.

TABLE 1A

| | Example Number | | | | | | | |
|---|---|---|---|---|---|---|---|---|
| | 8 | 9 | 10 | 11 | 12 | 13 | 14 | 15 |
| Guar, ppt | 50 | 50 | 50 | 50 | 45 | 45 | 45 | 45 |
| Sodium hydroxide, ppt | 12 | 9 | 9 | 9 | 9 | 9 | 12 | 12 |
| Sodium gluconate, ppt | 30 | 30 | 30 | 30 | 30 | 30 | 30 | 30 |
| Sodium thiosulfate, ppt | 50 | 40 | 40 | 40 | 40 | 40 | 40 | 40 |
| Triethanolamine, gpt | 3 | 3 | 3 | 5 | 3 | 1.5 | 0 | 0 |
| Sodium Borate, gpt | 6 | 6 | 5 | 6 | 6 | 6 | 5 | 5 |

TABLE 1B

| | Example Number | | | | | |
|---|---|---|---|---|---|---|
| | 16 | 17 | 18 | 19 | 20 | 21 |
| Guar, ppt | 40 | 40 | 40 | 40 | 40 | 40 |
| Sodium hydroxide, ppt | 12 | 9 | 12 | 9 | 12 | 9 |
| Sodium gluconate, ppt | 30 | 30 | 30 | 30 | 30 | 30 |
| Sodium thiosulfate, ppt | 40 | 40 | 40 | 40 | 40 | 50 |
| Triethanolamine, gpt | 3 | 3 | 0 | 0 | 0 | 0 |
| Sodium Borate, gpt | 6 | 6 | 5 | 5 | 6 | 6 |

Examples 22-24

Examples 22, 23, and 24 are prepared by mixing water with potassium chloride, sodium thiosulfate, guar gel, an activator package, and sodium borate, using the concentrations shown in Table 2. The activator package is a mixture of trietheanolamine, sodium gluconate and sodium hydroxide. Example 24 includes additional sodium hydroxide at a concentration of 2 gallons per thousand gallons (gpt) of fluid to increase the initial pH of the fluid. Before testing, the pH of Examples 22, 23, and 24 are measured as 12.01, 10.51, and 13.1, respectively.

The fluids of Examples 22, 23, and 24 are evaluated in a rheometer at a constant temperature of about 290° F. (about 143° C.). The initial shear rate is about 640 1/s for the first 6 minutes of the test. Then the shear rate is increased to about 935 1/s for the next two minutes. At about 8 minutes, the shear rate is decreased to about 100 1/s and held at this rate except for 1 minute ramps down to 25 1/s followed immediately by 1 minute ramps back up to 100 1/s at times of about 40 minutes, 91 minutes, 121 minutes, 151 minutes, 181 minutes, 211 minutes, 241 minutes, and 271 minutes. Results of the rheometer test are summarized in Table 2. Example 22 has a viscosity greater than 400 cps after about 4 hours.

Figure 9:
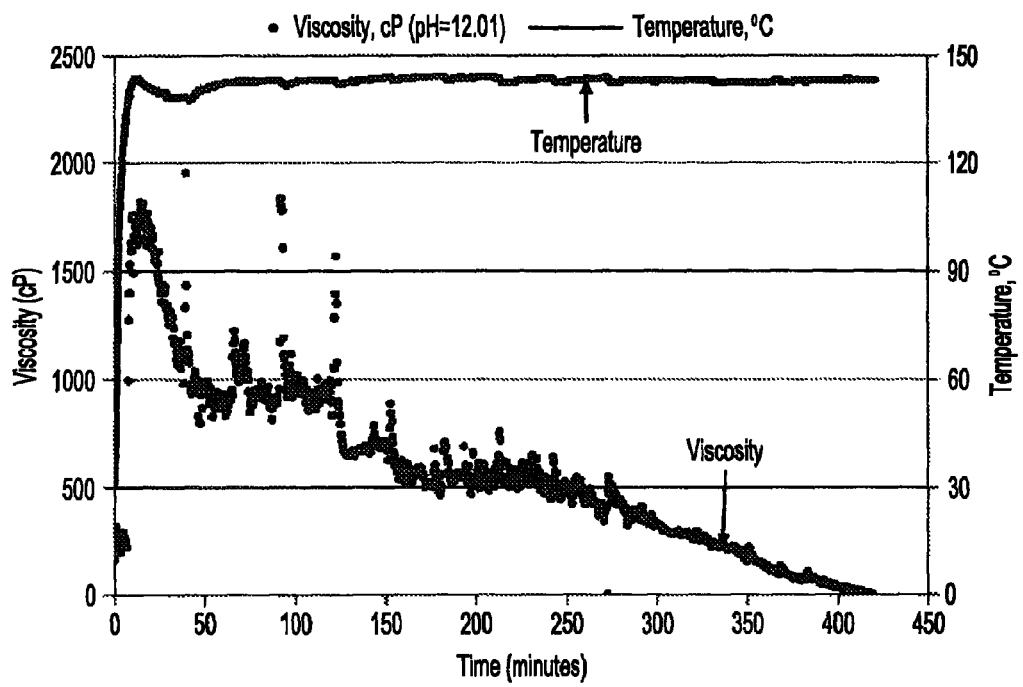
FIG. 9 is an illustrative viscosity versus time curve.

An illustrative expected viscosity versus time curve for Example 22 is given in FIG. 9. FIG. 9 also shows that after the initial transient, the temperature of the test sample is generally constant at about 143° C. The test is stopped after about 420 minutes and the final pH is measured to be about 9.01. During the test, each time the shear rate is reduced to 25 1/s, the viscosity increases. The maximum viscosity, measured when the shear rate is about 100 1/s, is about 1820 centipoise (cP), the viscosity remains above about 900 cP until about 123 minutes, and above about 500 cP until about 230 minutes. The time for the viscosity to drop below about 600 cP is greater than about 150 minutes, and the time for the viscosity to drop below 400 cP is greater than about 4 hours.

Figure 10:
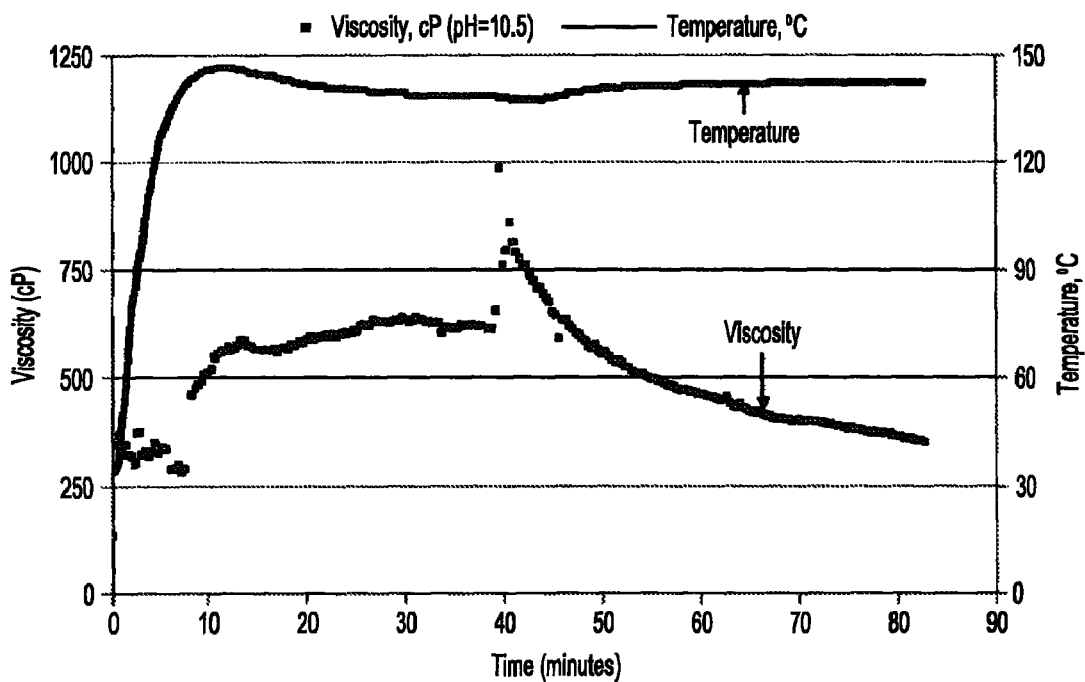
FIG. 10 is an illustrative viscosity versus time curve.

An illustrative expected viscosity versus time curve for Example 23 is given in FIG. 10. FIG. 10 also shows that after the initial transient, the temperature of the test sample is generally constant at about 143° C. The test is stopped after about 84 minutes and the final pH is measured to be about 9.15. During the test, when the shear rate is reduced to 25 1/s, the viscosity increases. The maximum viscosity, when the shear rate is at 100 1/s, is about 640 cP. The time for the viscosity to drop below about 600 cP is about 46 minutes, and the time for the viscosity to drop below 400 cP is about 71 minutes.

Figure 11:
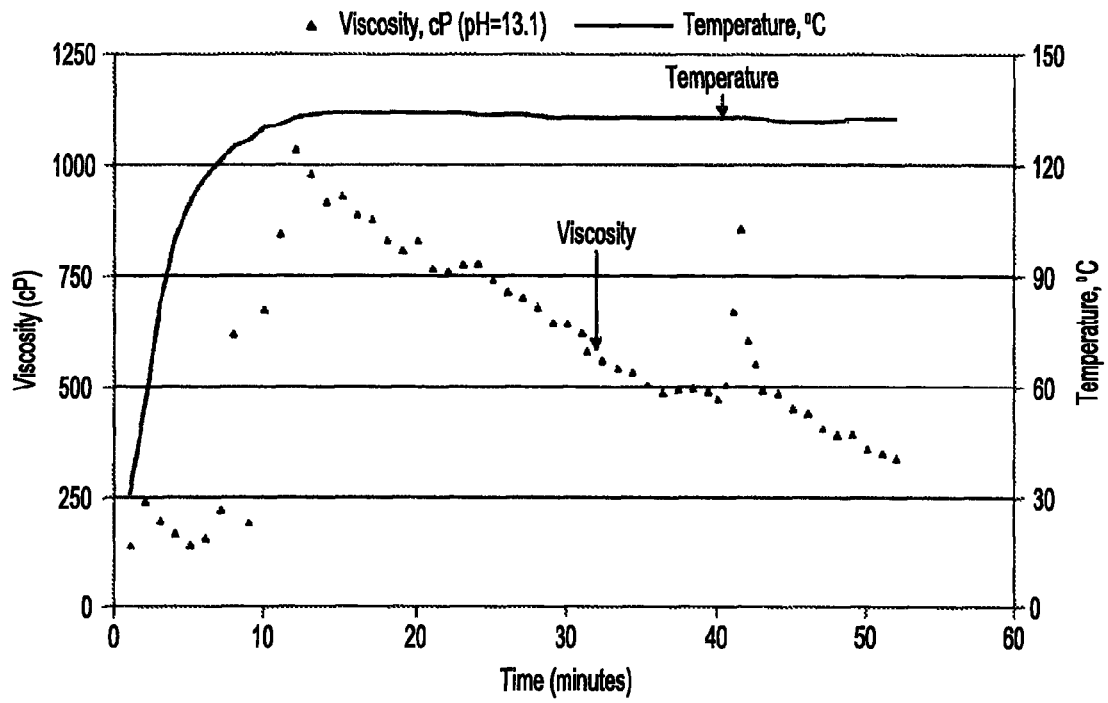
FIG. 11 is an illustrative viscosity versus time curve.
Figure 12:
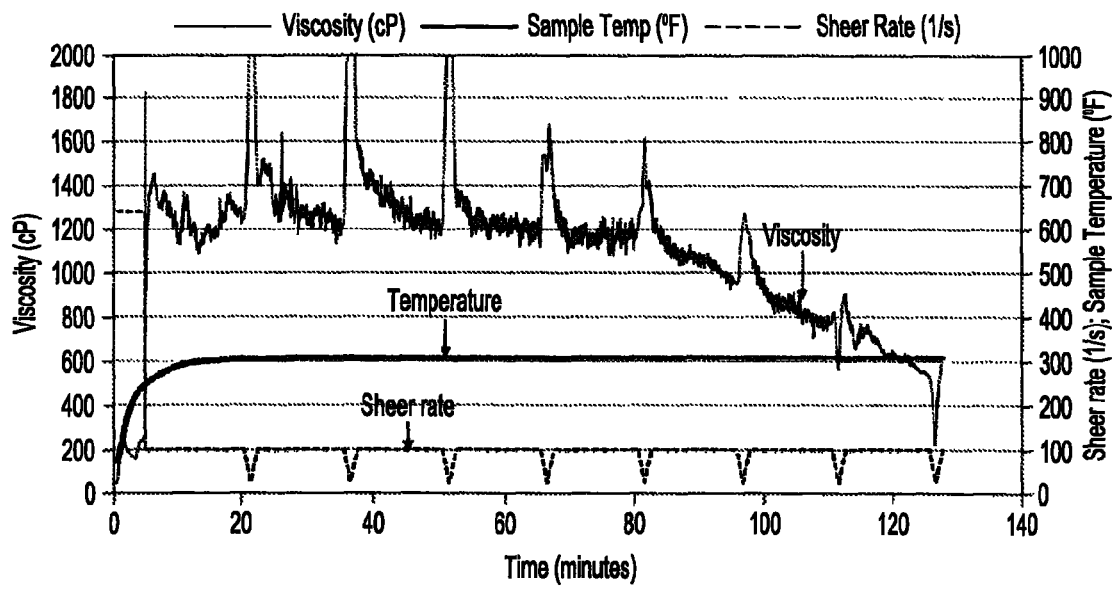
FIG. 12 is a rheometer curve illustrating the capabilities expected for a fluid composition at about 310° F.
Figure 13:
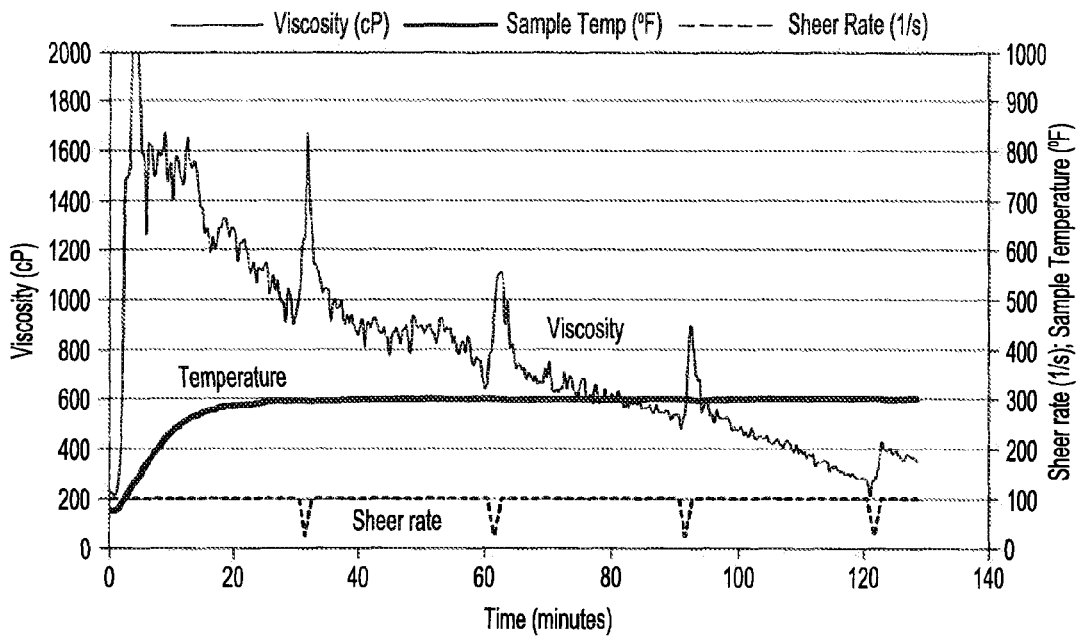
FIG. 13 is a rheometer curve illustrating the capabilities expected for a fluid composition including a gel breaker at about 300° F.
Figure 14:
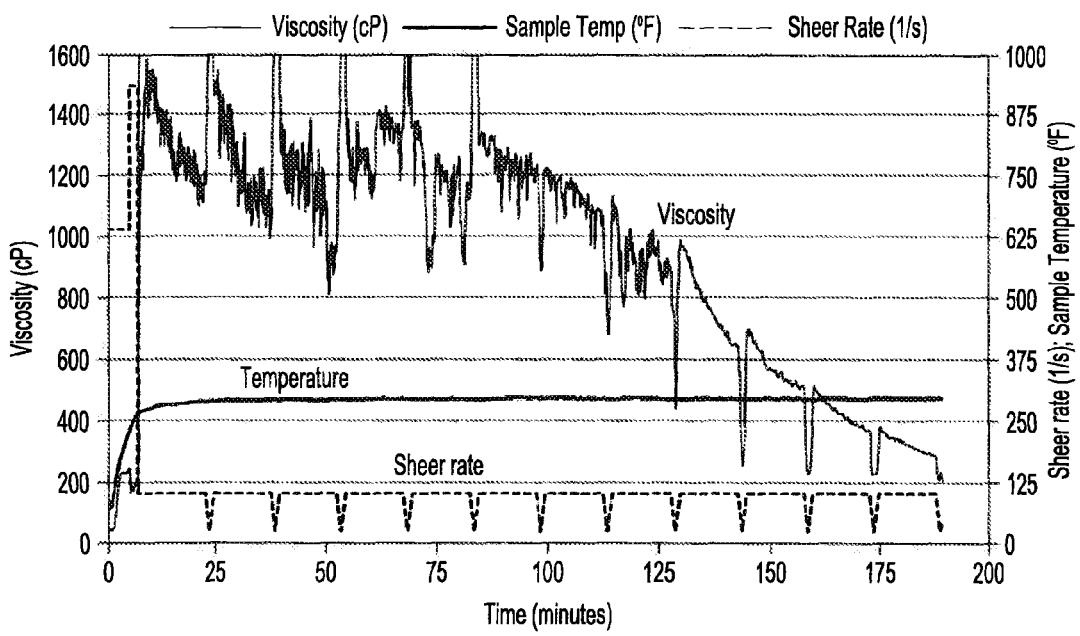
FIG. 14 is a rheometer curve illustrating the capabilities expected for a fluid composition at about 295° F.
Figure 15:
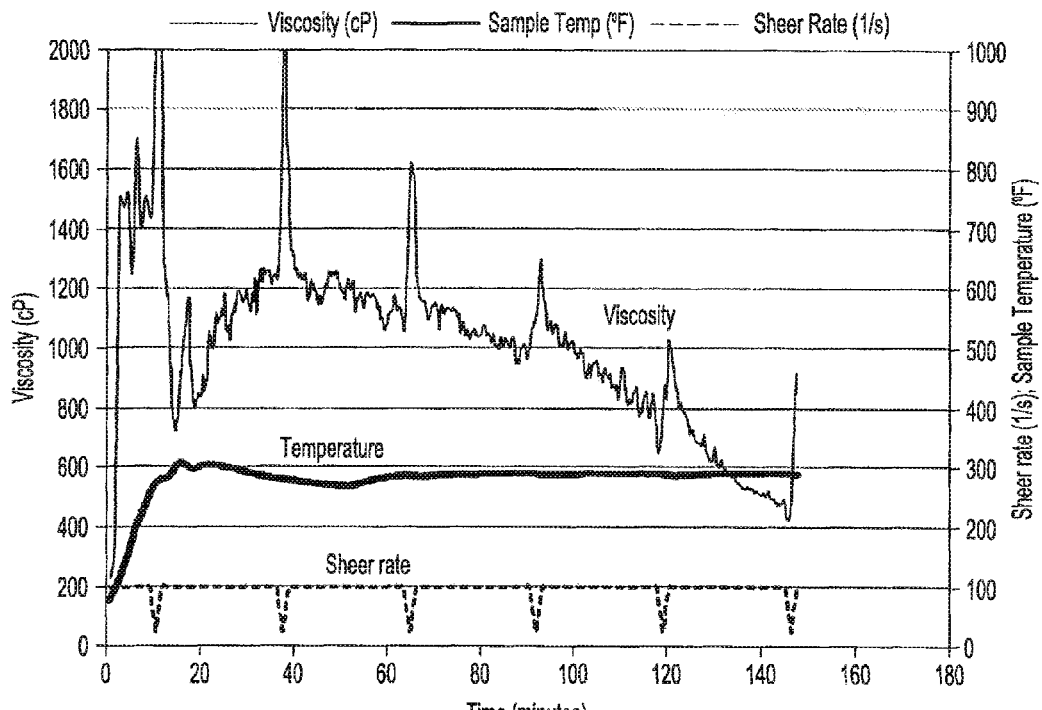
FIG. 15 is a rheometer curve illustrating the capabilities of a fluid composition including a gel breaker at about 290° F.
Figure 16:
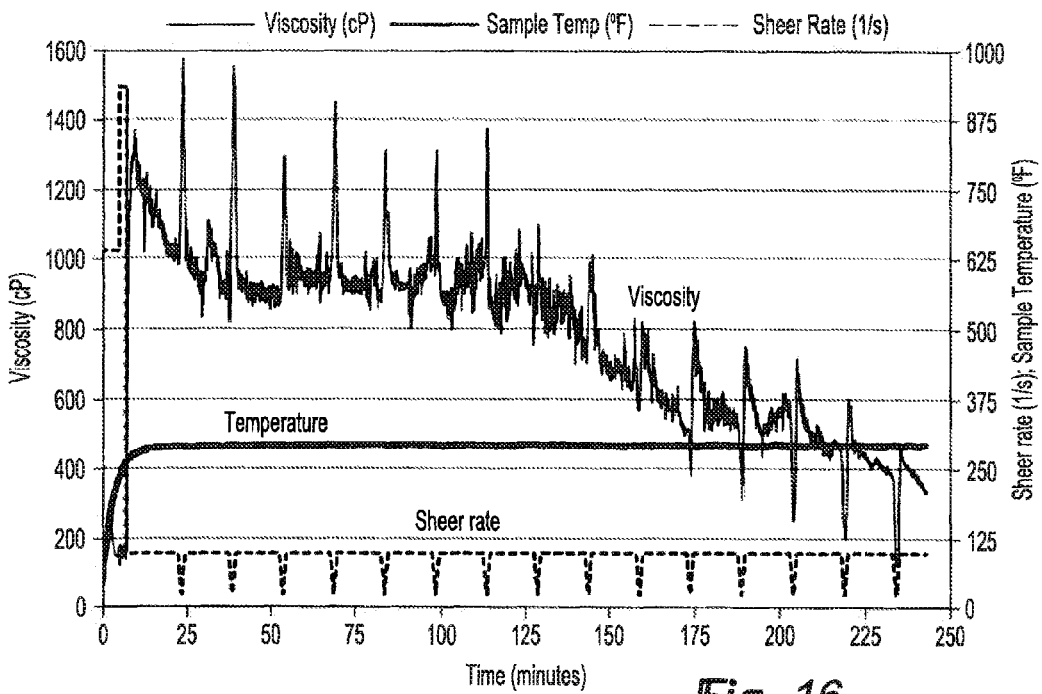
FIG. 16 is a rheometer curve illustrating the capabilities expected for a fluid composition at about 290° F.
Figure 17:
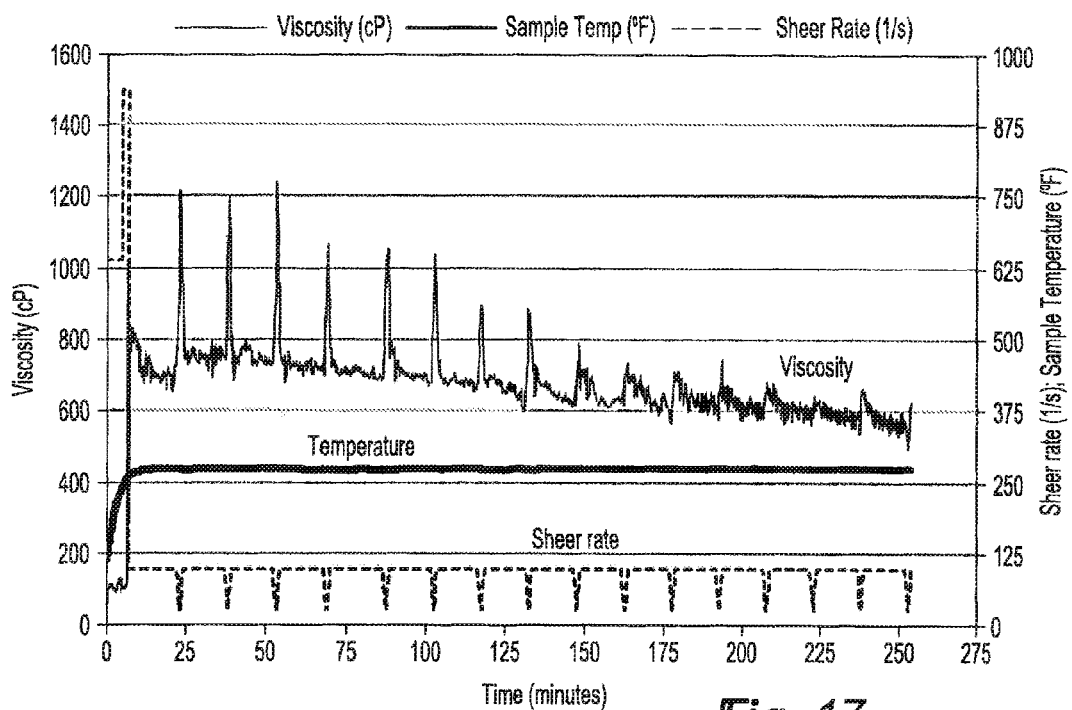
FIG. 17 is a rheometer curve illustrating the capabilities expected for a fluid composition at about 280° F.
Figure 18:
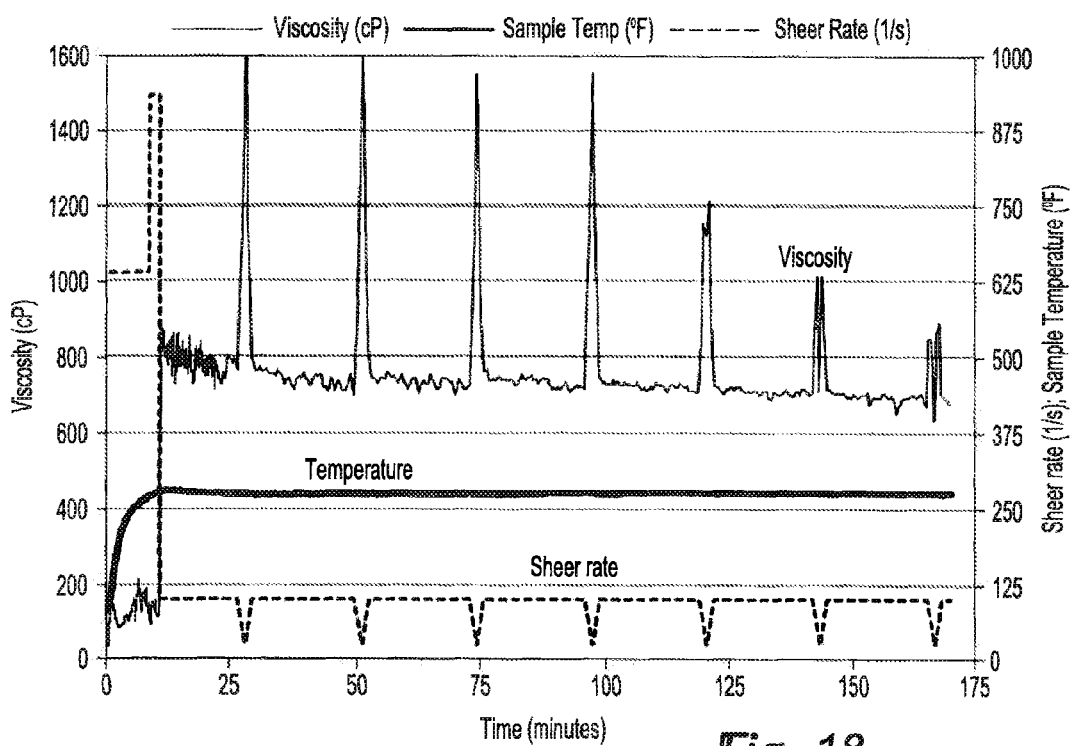
FIG. 18 is a rheometer curve illustrating the capabilities expected for a fluid composition at about 275° F.
Figure 19:
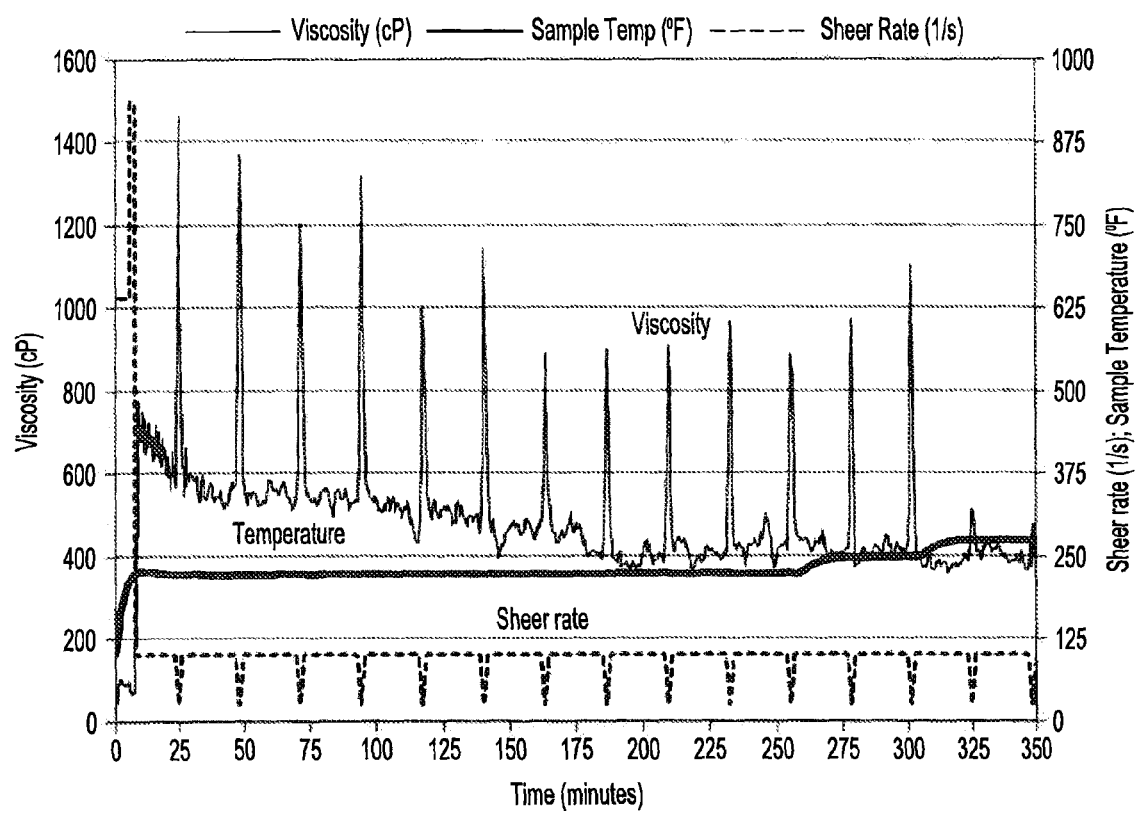
FIG. 19 is a rheometer curve illustrating the capabilities expected for a fluid composition at about 225° F.

An illustrative expected viscosity versus time curve for Example 24 is given in FIG. 11. FIG. 11 also shows that after the initial transient, the temperature of the test sample is generally constant at about 143° C. The test is stopped after about 52 minutes and the final pH is measured to be about 9.06. During the test, when the shear rate is reduced to 25 1/s, the viscosity increases. The maximum viscosity, when the shear rate is at 100 1/s, is about 1035 cP. The time for the viscosity to drop below about 600 cP is about 31 minutes, and the time for the viscosity to drop below 400 cP is about 48 minutes. Thus tested, the viscosity of Example 22 remains above 400 cP for a much longer time relative to Examples 23 and 24.

TABLE 2

| | Example Number | | |
|---|---|---|---|
| | 22 | 23 | 24 |
| Potassium chloride, wt. % | 2 | 2 | 2 |
| Sodium Thiosulfate, ppt | 50 | 50 | 50 |
| Guar Gel, ppt | 50 | 50 | 50 |
| Activator[1], gpt | 12 | 12 | 12 |
| Sodium borate, ppt | 6 | 30 | 6 |
| Sodium Hydroxide | | | 2 |
| Initial pH | 12.01 | 10.51 | 13.1 |

TABLE 2-continued

| | Example Number | | |
|---|---|---|---|
| | 22 | 23 | 24 |
| Final pH (post-test) | 9.01 | 9.15 | 9.06 |
| Test temperature, ° F. | 290 | 290 | 290 |
| Test temperature, ° C. | 143 | 143 | 143 |
| Maximum viscosity, cP | 1820 | 987 | 1035 |
| Time for viscosity to drop below 600 cps, minutes | 151 | 46 | 31 |
| Time for viscosity to drop below 400 cps, minutes | 266 | 71 | 48 |

[1]Activator is a mixture of trietheanolamine, sodium gluconate and sodium hydroxide Examples 25, 26, 27, 28, 29, 30, 31, and 32

Examples 25 through 32 are fluid compositions having an initial pH from about 11.7 to about 12.1. Examples 25 through 32 are prepared by mixing the compositions shown in TABLE 3A with water. Examples 25 through 32 include an activator/stabilizer component, a cross-linking component, and a gelling agent component. The activator/stabilizer component includes a thiosulfate compound, a gluconate salt, and an amine compound. The activator/stabilizer component includes about 37.22 weight percent water, about 19.25 weight percent sodium gluconate, about 12.72 weight percent triethanolamine, about 25.67 weight percent sodium thiosulfate, and about 5.14 weight percent sodium hydroxide. The cross-linking component includes a boron containing compound. The gelling agent component includes a guar gelling agent. Examples 26, 28, 29, 30, 31, and 32 also contain potassium chloride. Examples 26 and 28, also include an encapsulated gel breaker. Examples 29 through 32 contain a defoamer, a surfactant, a microemulsion, and a biocide. The initial pH of Examples 25 through 32 is between 11.7 and 12.1, as shown in Table 3A.

TABLE 3A

| | Example Number | | | | | | | |
|---|---|---|---|---|---|---|---|---|
| | 25 | 26 | 27 | 28 | 29 | 30 | 31 | 32 |
| Potassium Chloride, wt. % | | 2 | | 2 | 2 | 2 | 2 | 2 |
| Defoamer, gpt | | | | | 0.5 | 0.5 | 0.5 | 0.5 |
| Surfactant, gpt | | | | | 1 | 1 | 1 | 1 |
| Mircoemulsion, gpt | | | | | 2 | 2 | 2 | 2 |
| Component 1: Activator/Stabilizer, gpt | 17 | 16 | 17 | 16 | 15 | 14 | 14 | 8 |
| Component 2: Cross-Linking Package, gpt | 5 | 5 | 5 | 5 | 4.5 | 4.5 | 4.5 | 4 |
| Biocide, gpt | | | | | 0.5 | 0.5 | 0.5 | 0.5 |
| Component 3: Gelling component, ppt | 50 | 50 | 50 | 50 | 50 | 40 | 40 | 35 |
| Encapsulated gel breaker, ppt | | 1 | | 1 | | | | |
| Initial pH | 11.9 | 11.9 | 11.8 | 12.1 | 11.85 | 11.8 | 11.9 | 11.7 |

The fluids of Examples 25 through 31 are evaluated in a rheometer at a constant temperature as given by the initial test temperature in Table 3B. The test temperature for Example 32 is initially about 225° F., and is increased to about 245° F. at a test time of about 260 min, and is further increased to about 272° F. at a test time of about 305 minutes. The shear rates are listed in Table 3B. Beginning at a test time of about 7 minutes, the shear rate for each example is about 100 1/s. Once every 15 to 30 minutes, the shear rate is ramped down to 25 1/s over a time of 1 minute and then immediately ramped back to 100 1/s over a time of 1 minute. The time between successive shear rate rampings is given in Table 3B. The viscosity, shear rate, and test temperature are plotted as a function of time for Examples, 25, 26, 27, 28, 29, 30, 31, and 32, in FIGS. 12, 13, 14, 15, 16, 17, 18, and 19 respectively. The maximum viscosity at a shear rate of 100 1/s, the time the viscosity drops below 600 cP (at a shear rate of about 100 1/s), the time the viscosity drops below about 400 cP (at a shear rate of about 100 1/s), the total test time, and the final viscosity (at a shear rate of about 100 1/s) are given in Table 3B. As shown in FIGS. 12 through 19, and Table 3B, the fluid composition of the present invention may have a time for the viscosity to drop below 400 cP greater than about 100 minutes, preferably greater than about 120 minutes, and more preferably greater than about 180 minutes. As illustrated by the results of Examples 25 through 32, one activator/stabilizer component, one cross-linking component, and one gelling agent component, can be used in preparing a series of fluid compositions capable of being used over a wide range of temperatures (e.g., from about 225° F. to about 310° F.).

wise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight, and vice versa. Thus, an expression in the Detailed Description of the Invention of a range in terms of at "'x' parts by weight of the resulting polymeric blend composition" also contemplates a teaching of ranges of same recited amount of "x" in percent by weight of the resulting composition, and vice versa.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of"

TABLE 3B

| | Example Number | | | | | | | |
|---|---|---|---|---|---|---|---|---|
| | 25 | 26 | 27 | 28 | 29 | 30 | 31 | 32 |
| Test Conditions | | | | | | | | |
| Initial Test temperature[2], ° F. | 310 | 300 | 295 | 290 | 290 | 280 | 275 | 225 |
| Initial Test temperature, ° C. | 154 | 149 | 146 | 143 | 143 | 138 | 135 | 107 |
| Shear rate (0-5 minute), 1/s | 640 | 100 | 640 | 640 | 640 | 640 | 640 | 640 |
| Shear rate (5-7 minute), 1/s | 100 | 100 | 935 | 100 | 935 | 935 | 935 | 935 |
| Shear rate (7 min.-end), 1/s | 100 | 100 | 100 | 100 | 100 | 100 | 100 | 100 |
| Shear rate ramped from 100 1/s to 25 1/s and then back to 100 1/s (1 minute ramps) | Yes | Yes | Yes | Yes | Yes | Yes | Yes | Yes |
| Time between ramp to 25 1/s, min | 30 | 30 | 15 | 30 | 15 | 15 | 23 | 23 |
| Test results | | | | | | | | |
| Maximum viscosity (at 100 1/s), cP | 1520 | 1600 | 1590 | 1705 | 1340 | 835 | 860 | 745 |
| Time for viscosity to drop below 600 1/s, min | 122 | 77 | 148 | 146 | 164 | 199 | >169 | 21 |
| Time for viscosity to drop below 400 1/s, min | >127 | 110 | 168 | >163 | 230 | >253 | >169 | 191 |
| Total test time, min | 127 | 128 | 187 | 163 | 242 | 253 | 169 | 349 |
| Final viscosity, cP | 545 | 350 | 117 | 480 | 331 | 570 | 680 | 365 |

[2]Target temperature is constant throughout test except Example 32: temperature is increased to about 245° F. after 260 minutes and to about 272° F. after 305 minutes.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Liketo describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An additives package comprising
   i) one or more gelling agents;
   ii) one or more cross-linking agent;
   iii) a high temperature stabilizer including a thiosulfate and an amine compound, wherein the concentration of the amine compound is less than 20 wt. %, based on the total weight of the active ingredients in the additives package;
   iv) water, wherein the additives package is water based; and
   v) a metallic base;
   wherein the total concentration of any titanium and zirconium cross-linking agents is less than 20 weight percent based on the total concentration of the one or more cross-linking agents;
   so that the additives package may be used in a fluid composition for fracturing a subterranean formation having a temperature greater than 150° C.

2. The additives package of claim 1, wherein
   the cross-linking agent includes a boron containing compound;
   the additives package includes a clay stabilizer, wherein the clay stabilizer includes a metal halide salt;
   the additives package includes a cross-link retarder, wherein the cross-link retarder includes a gluconate salt; and
   the additives package includes a gel breaker, wherein the gel breaker includes a metal bromate.

3. The additives package of claim 1, wherein the additives package includes an alcohol at a concentration of less than 10 wt. % based on the additives package.

4. The additives package of claim 1, wherein the additives package includes a diol selected from the group consisting of ethylene glycol, propylene glycol, a derivative thereof, and any combination thereof, at a concentration from 0.1 wt. % to 20 wt. % based on the total weight of the additives package.

5. The additives package of claim 2, wherein the additives package includes the amine compound at a concentration greater than about 0.1 wt. % and the thiosulfate at a concentration greater than about 0.1 wt. %; wherein the additives package can be used in fracturing subterranean formations at a temperature greater than 175° C.

6. The additives package of claim 2, wherein the gel breaker is an encapsulated bromate, and the clay stabilizer includes potassium chloride.

7. The additives package of claim 3, wherein
   the additives package includes a clay stabilizer, and the clay stabilizer includes potassium chloride;
   the gelling agent includes guar gum;
   the cross-linking agent includes a boron salt;
   the amine compound is an alkanolamine;
   the metal base includes sodium hydroxide;
   the additives package includes a cross-link retarder that includes a gluconate salt; and
   the additives package includes a gel breaker that includes a metal bromate.

8. The additives package of claim 2, wherein the additives package consists of active
   ingredients and the water; wherein
   a) the cross-link retarder is present at a concentration from 2 weight percent to 25 weight percent based on the total concentration of active ingredients in the additives package, and the cross-link retarder includes sodium gluconate;
   b) the cross-linking agent is present at a concentration from 2 weight percent to 35 weight percent based on the total concentration of active ingredients in the additives package, and the cross-linking agent includes a boron salt;
   c) the gelling agent is present at a concentration from 2 weight percent to 35 weight percent based on the total concentration of active ingredients in the additives package, and the gelling agent includes guar gum; and
   d) the metallic base is present at a concentration from 0.5 weight percent to 8 weight percent based on the total concentration of active ingredients in the additives package.

9. The additives package of claim 2, wherein the amine compound is a an alkanolamine.

10. The additives package of claim 9, wherein the alkanolamine is a trialkanolamine.

11. The additives package of claim 1, wherein the additives package is free of volatile organics.

12. A fluid composition for fracturing a subterranean formation including:
    the additives package of claim 1; and
    about 50 wt. % or more of a carrier liquid based on the total weight of the fluid, wherein the carrier liquid includes water, and the fluid composition is water based.

13. The fluid composition of claim 12, wherein the fluid composition includes:
    a clay stabilizer at a concentration from about 30 to about 500 pounds per thousand gallons of fluid;
    the gelling agent at a concentration from about 5 to about 150 pounds per thousand gallons of fluid;
    the metallic base at a concentration from about 0.5 to about 50 pounds per thousand gallons of fluid;
    the high temperature stabilizer at a concentration from about 2 to about 160 pounds per thousand gallons of fluid; and the cross-linking agent at a concentration from about 0.5 to about 50 gallons per thousand gallons of fluid.

14. The fluid composition of claim 13, wherein the fluid composition includes a cross-link retarder at a concentration from about 1 to about 150 pounds per thousand gallons of fluid, and the high temperature stabilizer at a concentration from 2 to 160 pounds per thousand gallons of fluid.

15. The fluid composition of claim 13, wherein the fluid composition includes:

a) the amine compound at a concentration from about 0.5 to about 100 gpt, wherein gpt is units of gallons per thousand gallons of fluid;
b) the diluent at a concentration from about 0.5 to about 200 gpt; and
c) a proppant.

16. The fluid composition of claim 12, wherein the fluid composition includes a sufficient amount of the metallic base so that the fluid composition has a pH from about 10 to about 13.5 at a temperature of about 25° C.

17. The fluid composition of claim 12, wherein the gelling agent includes a refined or purified guar gum, and the fluid composition is characterized as having good shear stability such that the viscosity of the fluid composition increases by at least 10% when the shear rate is decreased from about 100 s$^{-1}$ to about 30 s$^{-1}$ after being at an elevated temperature of about 121° C. for about 20 minutes.

18. A process for recovering a hydrocarbon including the steps of:
 i) injecting the fluid composition of claim 12 into a subterranean formation; and
 ii) fracturing the subterranean formation;
 wherein the fluid in the subterranean formation has a temperature of about 105° C. or more.

19. The process of claim 18, wherein the fluid in the subterranean formation has a temperature of about 175° C. or more.

20. A petroleum based product made using the hydrocarbon recovered by the process of claim 18.

21. The fluid composition of claim 12, wherein
the fluid composition includes: a clay stabilizer at a concentration from about 30 to about 500 pounds per thousand gallons of fluid, the gelling agent at a concentration from about 5 to about 150 pounds per thousand gallons of fluid, the metallic base at a concentration from about 0.5 to about 50 pounds per thousand gallons of fluid, the cross-linking agent at a concentration from about 0.5 to about 50 gallons per thousand gallons of fluid, a cross-link retarder at a concentration from about 1 to about 150 pounds per thousand gallons of fluid, and the high temperature stabilizer at a concentration from 2 to 160 pounds per thousand gallons of fluid;
the amine compound includes an trialkanolamine and the concentration of the amine compounds from about 0.5 to about 100 gallons per thousand gallons of fluid;
the fluid composition includes a sufficient amount of the metallic base so that the fluid composition has a pH from about 10 to about 13.5 at a temperature of about 25° C.;
the gelling agent includes a refined or purified guar gum; and
the fluid composition is characterized as having good shear stability such that the viscosity of the fluid composition increases by at least 10% when the shear rate is decreased from about 100 s$^{-1}$ to about 30 s−1 after being at an elevated temperature of about 121° C. for about 20 minutes.

22. A fluid composition for fracturing a subterranean formation comprising:
 i) at least 50 wt. % of a carrier liquid including water, based on the total weigh of the fluid composition;
 ii) a guar gum, wherein the guar gum is present at a concentration from 0.599 to 18.0 kg/m$^3$ of the fluid composition;
 iii) at least 1 m$^3$ cross-linking agent per 1000 m$^3$ of the fluid composition, including a boron salt;
 iv) a high temperature stabilizer that includes an alkanolamine and a thiosulfate, wherein the concentration of the alkanolamine is from 0.05 m$^3$ to 20 m$^3$ per 1000 m$^3$ of the fluid composition;
 v) a sufficient amount of the sodium hydroxide so that the fluid composition has a pH from about 10 to about 13.5 at a temperature of about 25° C.;
 vi) a gluconate salt; and
 vii) a metal halide;
 wherein the concentration of any titanium and zirconium cross-linking agents is less than 20 weight percent based on the total weight of the cross-linking agents in the fluid composition.

23. A fluid composition for fracturing a subterranean formation comprising:
 i) at least 50 wt. % of a carrier liquid including water, based on the total weigh of the fluid composition;
 ii) 0.599 kg to 18.0 kg of a refined guar gum per m$^3$ of the fluid composition;
 iii) a cross-linking agent including 1 m$^3$ to 50 m$^3$ of a boron salt per 1000 m$^3$ of the fluid composition;
 iv) from 0.05 m$^3$ to 100 m$^3$ of high temperature stabilizers per 1000 m$^3$ of the fluid composition, wherein the high temperature stabilizer includes an amine compound and a thiosulfate, wherein the concentration of the amine compound is from 0.05 m$^3$ to 20 m$^3$ per 1000 m$^3$ of the fluid composition, and wherein the amine compound includes an alkanolamine;
 v) a sufficient amount of sodium hydroxide so that the fluid composition has a pH from about 10 to about 13.5 at a temperature of about 25° C.;
 vi) from 0.119 kg to 9.59 kg of a gluconate salt per m$^3$ of the fluid composition; and
 vii) from 0.024 kg to 7.91 kg of a metal bromate per m$^3$ of the fluid composition;
 wherein the concentration of any titanium and zirconium cross-linking agents is less than 20 weight percent based on the total weight of the cross-linking agents in the fluid composition; the weight ratio of the thiosulfate to the metal halide salt is from 1:20 to 2:1; and
 the fluid composition is characterized as having good shear stability such that the viscosity of the fluid composition increases by at least 10% when the shear rate is decreased from about 100 s$^{-1}$ to about 30 s$^{-1}$ after being at an elevated temperature of about 149° C. for about 20 minutes.

* * * * *

UNITED STATES PATENT AND TRADEMARK OFFICE
CERTIFICATE OF CORRECTION

PATENT NO. : 8,293,687 B2  
APPLICATION NO. : 12/831312  
DATED : October 23, 2012  
INVENTOR(S) : Wade J. Giffin It is certified that error appears in the above-identified patent and that said Letters Patent is hereby corrected as shown below:

Column 31, Line 54, Claim 21, "s-1" should be "$s^{-1}$"

Signed and Sealed this  
Nineteenth Day of February, 2013

Teresa Stanek Rea  
*Acting Director of the United States Patent and Trademark Office*